US012760195B2

(12) United States Patent
Harris et al.

(10) Patent No.: US 12,760,195 B2
(45) Date of Patent: Oct. 13, 2026

(54) PHOSPHOR-CONTAINING INKS FOR DISINFECTION AND IMPROVING PHOTOSTABILITY OF SYNTHETIC POLYMERS

(71) Applicant: THE BOEING COMPANY, Arlington, VA (US)

(72) Inventors: John N. Harris, Seattle, WA (US); Stephanie I. Metting, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 308 days.

(21) Appl. No.: 18/326,355

(22) Filed: May 31, 2023

(65) Prior Publication Data

US 2023/0407121 A1 Dec. 21, 2023

Related U.S. Application Data

(60) Provisional application No. 63/366,576, filed on Jun. 17, 2022, provisional application No. 63/366,582, filed on Jun. 17, 2022.

(51) Int. Cl.
*C09D 11/38* (2014.01)
*B41J 2/01* (2006.01)
(Continued)

(52) U.S. Cl.
CPC ................. *C09D 11/38* (2013.01); *B41J 2/01* (2013.01); *B41J 2/2107* (2013.01); *C09D 11/10* (2013.01);
(Continued)

(58) Field of Classification Search
CPC ......... C09D 11/36; C09D 11/40; C09D 11/30; C09D 11/38; C09D 11/32; C09D 11/322;
(Continued)

(56) References Cited

U.S. PATENT DOCUMENTS 5,888,424 A 3/1999 Ebnesajjad et al.
2002/0124772 A1 * 9/2002 Egger .................... B41M 3/144 106/31.9
(Continued)

FOREIGN PATENT DOCUMENTS

EP 3623447 A1 * 3/2020 ......... C09K 11/7777
JP 2000256591 A 9/2000
(Continued)

OTHER PUBLICATIONS

Lehnert, Andreas (ISA Authorized Officer), PCT Notification of Transmittal of the International Search Report and the Written Opinion of the International Searching Authority, or the Declaration, issued Sep. 8, 2023 in related International Application No. PCT/US2023/024852, 10 pages.
(Continued)

*Primary Examiner* — Manish S Shah
(74) *Attorney, Agent, or Firm* — MH2 Technology Law Group LLP

(57) ABSTRACT

Described herein are phosphor-containing ink compositions for disinfecting surfaces and improving the photostability of synthetic polymers. Methods for preparing the ink compositions are additionally described.

20 Claims, 5 Drawing Sheets

(51) Int. Cl.

| | |
|---|---|
| ***B41J 2/21*** | (2006.01) |
| ***C09D 11/10*** | (2014.01) |
| ***C09D 11/101*** | (2014.01) |
| ***C09D 11/102*** | (2014.01) |
| ***C09D 11/106*** | (2014.01) |
| ***C09D 11/107*** | (2014.01) |
| ***C09D 11/322*** | (2014.01) |
| ***C09D 11/36*** | (2014.01) |
| ***C09D 11/50*** | (2014.01) |
| ***C09K 11/77*** | (2006.01) |

(52) U.S. Cl.

CPC .......... *C09D 11/101* (2013.01); *C09D 11/102* (2013.01); *C09D 11/106* (2013.01); *C09D 11/107* (2013.01); *C09D 11/322* (2013.01); *C09D 11/36* (2013.01); *C09D 11/50* (2013.01); *C09K 11/7705* (2013.01); *C09K 11/77064* (2021.01)

(58) Field of Classification Search

CPC ... C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2007/0257232 | A1* | 11/2007 | Tai ........................ | C09D 11/037 252/301.36 |
| 2009/0085049 | A1 | 4/2009 | Kolodin et al. | |
| 2009/0085464 | A1 | 4/2009 | Oguma et al. | |
| 2009/0130169 | A1* | 5/2009 | Bernstein ........... | C09K 11/7789 427/430.1 |
| 2009/0230247 | A1 | 9/2009 | Harris | |
| 2010/0233368 | A1* | 9/2010 | Zhu ......................... | C09D 11/36 427/256 |
| 2010/0295287 | A1* | 11/2010 | Reichert ................... | C09C 3/12 252/301.36 |
| 2011/0038947 | A1* | 2/2011 | Maurer .............. | C09K 11/7795 252/301.5 |
| 2012/0119143 | A1* | 5/2012 | Jia ....................... | C09K 11/7769 977/773 |
| 2012/0288972 | A1* | 11/2012 | McKean .............. | C09D 11/322 523/400 |
| 2014/0151607 | A1* | 6/2014 | Lowenthal ........... | C09D 11/101 252/514 |
| 2016/0312052 | A1* | 10/2016 | Cong ................... | C09D 11/101 |
| 2018/0194996 | A1 | 7/2018 | Frischeisen | |
| 2019/0106583 | A1* | 4/2019 | Johansson .............. | B41J 3/4075 |
| 2020/0354596 | A1* | 11/2020 | Aoyama .............. | C09D 11/322 |
| 2020/0377748 | A1* | 12/2020 | Aoyama .............. | C09D 11/037 |
| 2021/0061929 | A1* | 3/2021 | Kobayashi ............ | C08F 220/58 |
| 2023/0405158 | A1* | 12/2023 | Harris .............. | C09K 11/77064 |
| 2023/0407168 | A1 | 12/2023 | Harris | |

FOREIGN PATENT DOCUMENTS

| | | | | |
|---|---|---|---|---|
| JP | 2004075888 | A | 3/2004 | |
| WO | 2007118813 | A1 | 10/2007 | |
| WO | 2009/064845 | A2 | 5/2009 | |
| WO | 2009/064845 | A3 | 5/2009 | |
| WO | 2012151765 | A1 | 11/2012 | |
| WO | 2017077446 | A1 | 5/2017 | |
| WO | WO-2017182638 | A1 * | 10/2017 | ............. C09D 11/38 |
| WO | 2018/153437 | A1 | 8/2018 | |
| WO | 2021/257688 | A1 | 12/2021 | |

OTHER PUBLICATIONS

Haider, Ursula (PCT Authorized Officer), PCT Notification of Transmittal of the International Search Report and Written Opinion of the International Searching Authority issued Nov. 7, 2023 in International Application No. PCT/US2023/024855, 18 pages.

Cameron, Lorraine (ISA Authorized Officer), PCT Notification of Transmittal of the International Search Report and the Written Opinion of the International Searching Authority, or the Declaration, issued Sep. 14, 2023 in related International Application No. PCT/US2023/024849, 12 pages.

* cited by examiner

PHOSPHOR-CONTAINING INKS FOR DISINFECTION AND IMPROVING PHOTOSTABILITY OF SYNTHETIC POLYMERS

CROSS-REFERENCE TO RELATED APPLICATIONS

This application claims priority to U.S. Provisional Patent Application No. 63/366,582, filed on Jun. 17, 2022, and U.S. Provisional Patent Application No. 63/366,576, filed on Jun. 17, 2022, the contents of each of which are hereby incorporated by reference in their entirety.

TECHNOLOGICAL FIELD

The presently disclosed subject matter relates generally to phosphor-containing inks for disinfecting surfaces and improving the photostability of synthetic polymers.

BACKGROUND

Phosphor materials have the properties of emitting ultraviolet, visible, and infrared light by action of external exciting means such as irradiation of electromagnetic waves (e.g., electron beams, X-rays, ultraviolet rays, visible light, etc.) or application of an electric field, and therefore are used in a large number of photoelectric transducers or photoelectric conversion devices. Examples of such devices are light-emitting devices, including white light-emitting diodes, fluorescent lamps, electron beam tubes, plasma display panels, inorganic electroluminescent displays, and scintillators. Inorganic phosphors, in particular, have been extensively explored to meet the demand of low voltage stimulated lighting sources owing to increased global energy consumption. Due to their environmental friendliness, advantages of long lifetime, lower energy consumption, reliability, and high luminous efficiency, modern white light-emitting diodes (WLEDs) have replaced less effective incandescent and mercury-enclosing conventional fluorescent lighting sources.

The lanthanides are often used as phosphors for luminescence applications. For example, praseodymium's shielded f-orbitals allow for long excited state lifetimes and high luminescence yields. Indeed, $Pr^{3+}$ is often a dopant ion for use in red, blue, green, and ultraviolet phosphors.

BRIEF SUMMARY

In one aspect, the presently disclosed subject matter is directed to an ink composition comprising one or more inorganic phosphor dopants, a solvent, and a binder.

In another aspect, the presently disclosed subject matter is directed to a UV-curable ink composition comprising one or more inorganic phosphor dopants, one or more photoinitiators, and one or more monomers.

In another aspect, the presently disclosed subject matter is directed to an ink composition, wherein the ink composition has disinfection properties upon exposure to a UV light source.

In another aspect, the presently disclosed subject matter is directed to a synthetic polymer comprising a surface, wherein the surface is coated with a coating of an ink composition disclosed herein, and wherein the coating provides the synthetic polymer with improved color stability.

In another aspect, the presently disclosed subject matter is directed to a method for disinfecting a surface, wherein the surface is coated with an ink composition disclosed herein, the method comprising exposing the surface to a UV light source, wherein the exposing causes the one or more inorganic phosphor dopants in the ink composition to emit photons, and wherein the photons irradiate the surface, thereby disinfecting the surface.

In another aspect, the presently disclosed subject matter is directed to a method for improving color stability of a synthetic polymer comprising a surface, wherein the surface is coated with an ink composition disclosed herein, the method comprising exposing the surface to UV light, wherein the one or more inorganic phosphor dopants in the ink composition absorb the UV light and then emit the UV light as down-converted visible light.

In another aspect, the presently disclosed subject matter is directed to a method of making an ink composition comprising one or more inorganic phosphor dopants, a solvent, and a binder, the method comprising contacting a solvent with one or more inorganic phosphor dopants and a binder, wherein, the ink composition is prepared.

In another aspect, the presently disclosed subject matter is directed to a method of making a UV-curable ink composition comprising: one or more inorganic phosphor dopants; one or more photoinitiators; and one or more monomers, the method comprising: contacting one or more inorganic phosphor dopants with one or more photoinitiators and one or more monomers; wherein, the UV-curable ink composition is prepared.

These and other aspects are described fully herein.

The above summary is provided merely for purposes of summarizing some examples to provide a basic understanding of some aspects of the present disclosure. Accordingly, it will be appreciated that the above-described examples are merely examples and should not be construed to narrow the scope or spirit of the present disclosure in any way. It will be appreciated that the scope of the present disclosure encompasses many potential examples in addition to those here summarized, some of which will be further described below.

BRIEF DESCRIPTION OF THE DRAWINGS

Figure 1:
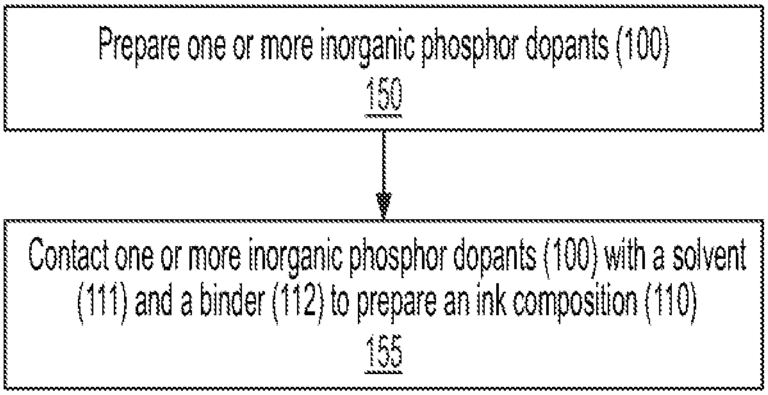

Having thus described certain examples of the present disclosure in general terms, reference will hereinafter be made to the accompanying drawings which are not necessarily drawn to scale, and wherein:

FIG. 1 shows a process for preparing an ink composition comprising one or more inorganic phosphor dopants according to methods described herein.

Figure 2:
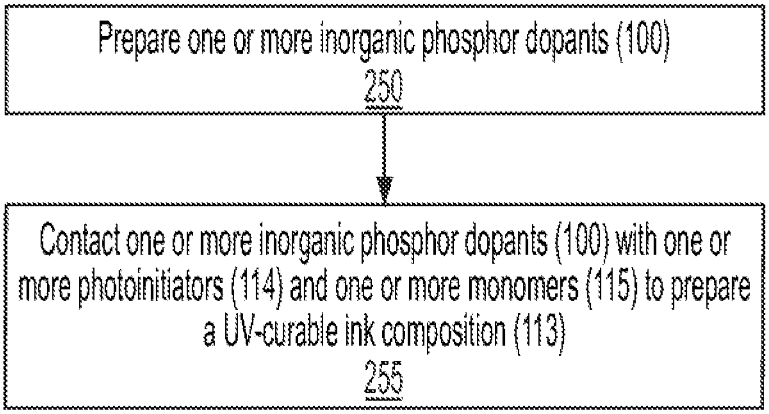

FIG. 2 shows a process for preparing a UV-curable ink composition comprising one or more inorganic phosphor dopants according to methods described herein.

Figure 3:
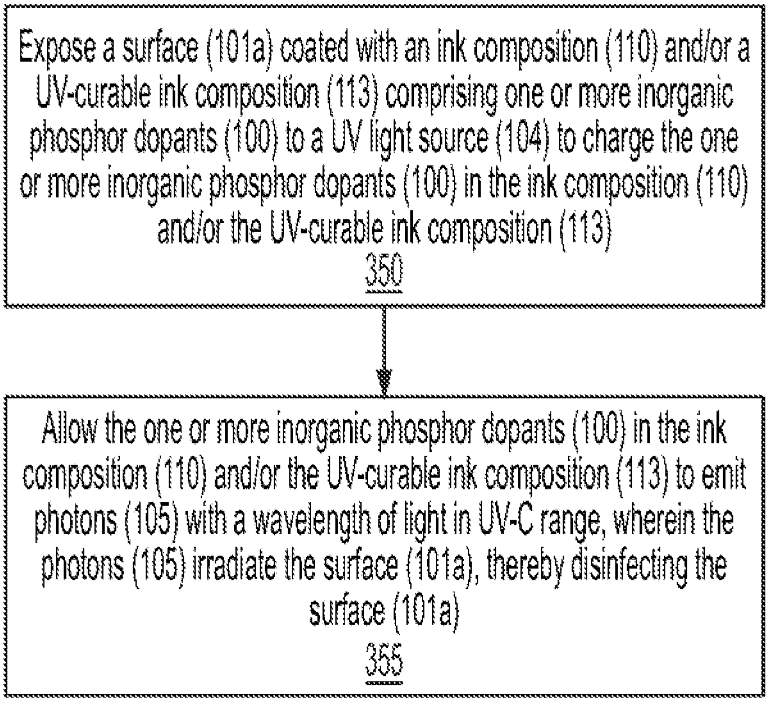

FIG. 3 shows a process for disinfecting a surface through application of the ink compositions according to methods described herein.

Figure 4:
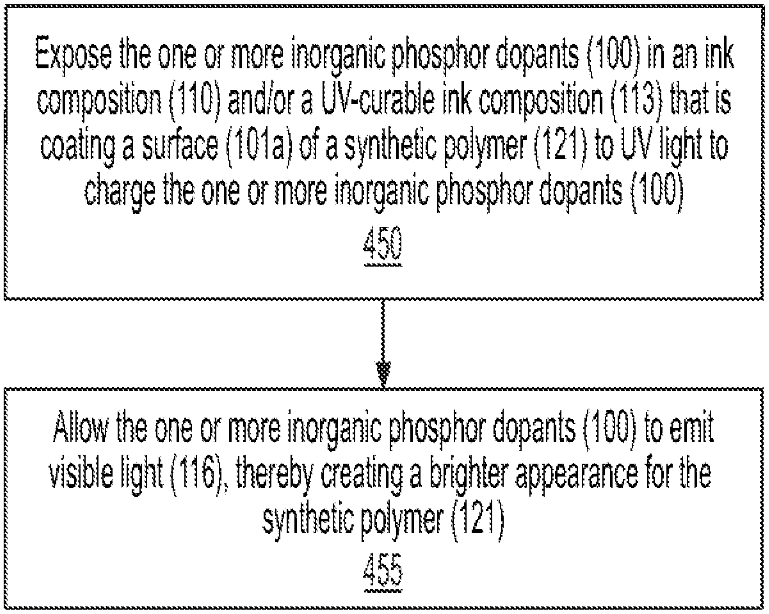

FIG. 4 shows a process for creating a brighter appearance for an object through application of the ink compositions according to methods described herein.

Figure 5:
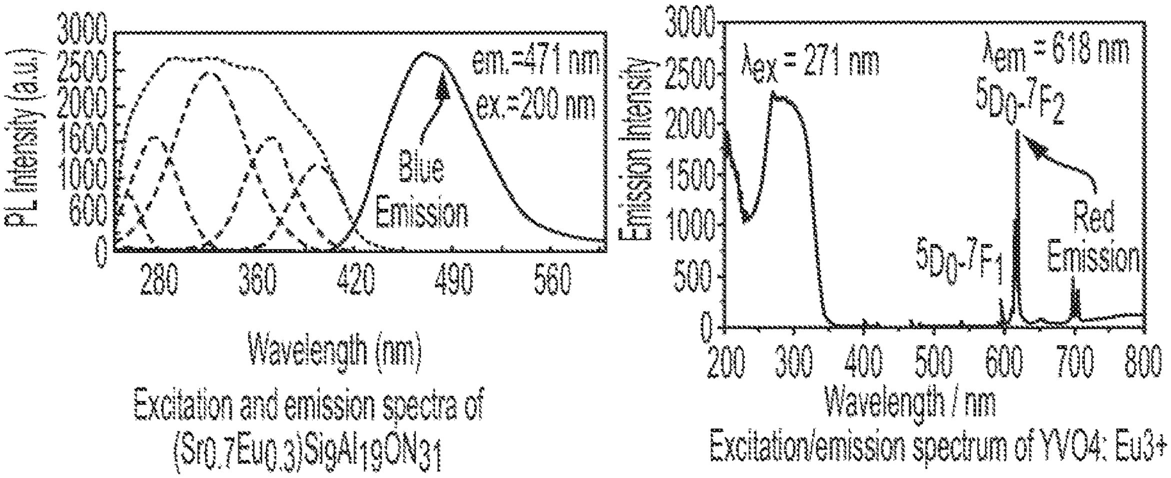

FIG. 5 shows exemplary excitation and emission spectra for inorganic phosphor dopants.

Figure 6:
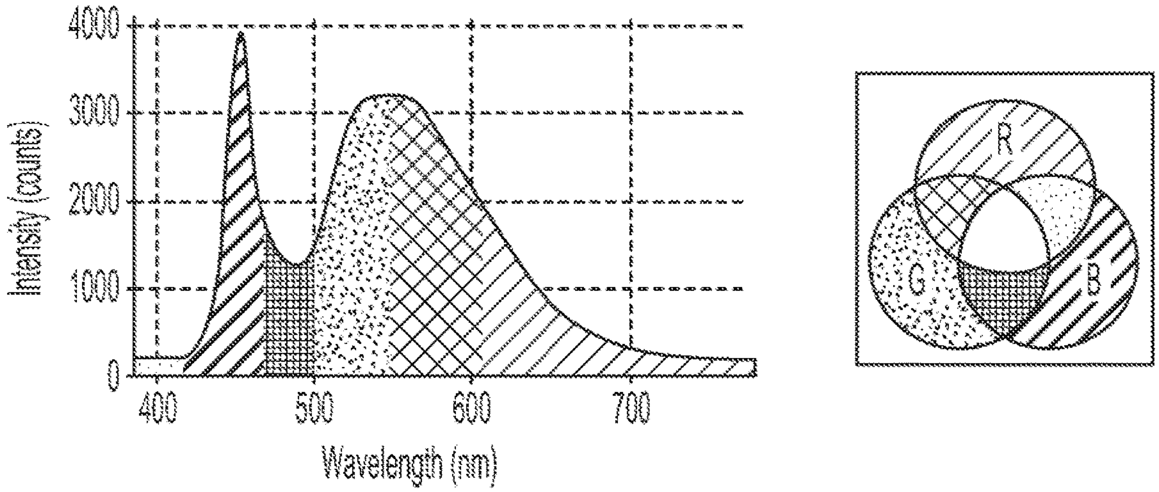

FIG. 6 shows how white light can be created by blending blue, green, and red emitted light.

Figure 7:
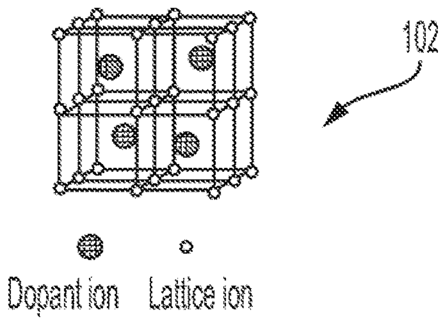

FIG. 7 shows an exemplary lattice structure of a doped solid state material (i.e. inorganic phosphor dopant).

DETAILED DESCRIPTION

The subject matter described herein relates to inorganic phosphor-containing ink compositions for use in disinfecting surfaces or improving the color stability of a synthetic polymer composition. The ink compositions, which can be printed on a wide variety of surfaces, such as, but not limited to, thermoplastics, harness the luminescent properties of inorganic phosphor dopant materials.

Disinfection

"Disinfection" refers to the reduction, inhibition, inactivation, destruction, and/or elimination of microorganisms, with the exception of bacterial endospores. The methods described herein offer several advantages over those of the art for disinfection. Indeed, art methods for disinfecting surfaces include application of expensive and heavy ultraviolet light sources. Extended exposure to these light sources can affect the substrate surface. Long exposure times to pulsing UV light are conventionally required for high touch areas. Other disinfection methods of the art include wiping the surface with a disinfection solution that typically loses effectiveness over a short period of time. Further, exposure to such chemicals can have unintended effects on the substrate surface.

As described herein, incorporating inorganic phosphors into an ink composition and then coating the ink composition on a surface of a substrate provides an emitting surface of UV-C light (200 nm to 280 nm) that can be used to disinfect the coated substrate surface over an extended period of time. After exposing the phosphor-containing ink coated surface to a UV excitation source, the ink coating emits photons for a tunable period of time after the excitation light has been removed. The phosphors in the ink coating absorb UV light directly. The phosphors then emit radiant energy, which disinfects the surface of the coated substrate. In this regard, the disinfection comes from the coated substrate surface itself. Furthermore, the disinfection methods described herein are durable in operation because the inorganic phosphors are incorporated uniformly into an ink and coated on the surface of a substrate, which minimizes degradation by wear or exposure to surface chemicals. Moreover, the ink composition coated on the surface of a substrate locates the inorganic phosphors closer to the surface as compared to embedding or otherwise incorporating the inorganic phosphors into the substrate itself (e.g., a thermoplastic substrate). The disinfection methods described herein can significantly reduce the time required to disinfect surfaces using conventional methods.

UV-C light is weak at the Earth's surface because the ozone layer of the atmosphere blocks it. Many disinfection methods use short-wavelength ultraviolet (ultraviolet C or UV-C) light to kill or inactivate microorganisms by destroying nucleic acids and disrupting their DNA, leaving them unable to perform vital cellular functions. The inorganic phosphors in the phosphor-containing ink compositions described herein emit such germicidal UV-C light, which works to disinfect a surface coated with the ink Color Stability Synthetic polymers, such as thermoplastics, will typically undergo photo-oxidation when exposed to UV light in the presence of oxygen. When polymers absorb this UV radiant energy, it can lead to bond breakage because the energy of the UV light is greater than the dissociation energy for the carbon-carbon sigma bonds in the synthetic polymer. Indeed, UV light has photon energies ranging from 6.2 eV to 4.4 eV. Conversely, the bond energy of a typical carbon-carbon sigma bond is only 3.8 eV. As such, the absorption of UV light, such as UV-C light, in the presence of oxygen can lead to bond dissociation oxidation, which results in changes in the molecular structure of the polymer. This change in structure is often accompanied by undesired visibly physical changes in the polymer, such as discoloration (yellowing) and embrittlement.

Current solutions to address the discoloration and embrittlement often experienced by synthetic polymers exposed to UV light include: (1) using polymers with greater color stability in applications where there is high UV light exposure; and/or (2) incorporating UV-stabilizing additives into synthetic polymer formulations. However, the synthetic polymers that exhibit satisfactory color stability can lack appropriate mechanical properties, such as impact durability and chemical resistance. Further, the additives used to improve color stability in synthetic polymers often reduce the material's mechanical properties, such as tensile strength. Such additives have also been shown to reduce the material's flammability properties. As such, there is a need in the art to stabilize the color of synthetic polymers being exposed to UV light without reducing other material performance properties.

Example implementations of the subject matter described herein overcomes the limitations of the art by incorporating inorganic phosphors into an ink composition and coating the ink composition on a surface of a synthetic polymer. The inorganic phosphors in the ink absorb UV light and convert it to harmless visible light. The inorganic phosphors applied in the methods and ink compositions described herein are crystalline materials, having a lattice structure that imparts high photostability, as depicted by the exemplary lattice structure of FIG. 7. The regular and rigid arrangement of atoms in the lattice equips the phosphor with enhanced thermostability, for example. In these phosphors, a small percentage of metal "dopant" ion is incorporated into the lattice that will impact the excitation and emission properties of the phosphor. As used herein, an inorganic phosphor dopant refers to a rare earth or transition metal-containing metal oxide or metal fluoride material. Since the inorganic phosphor materials are ceramic-type materials that only coat a surface of the synthetic polymer, there is no adverse impact on the mechanical or flammability properties of the synthetic polymer material. Many phosphors strongly absorb (high energy; short wavelength) UV light, which is accompanied by an emission of light at longer wavelengths and lower energy than what the phosphor originally absorbed. This emission is typically in the visible range, which is not destructive to synthetic polymers. The process of light absorption at one wavelength, followed by emission at a longer wavelength is known as "down conversion." The inorganic phosphors in the ink compositions described herein absorb high energy UV light (180 nm-360 nm) and emit that energy as "down-converted" visible light (200 nm-700 nm) as demonstrated by the exemplary excitation and emission spectra for example inorganic phosphors in FIG. 5.

As described herein, the color of the emitted light energy can be tailored by incorporating different metal ions into the metal oxide or metal fluoride host lattice. Combinations of different emitted light colors will yield white/off-white colored light. For example, blue-yellow or blue-green-red emitter combinations afford white/off-white emission. Such light emission combinations from phosphors can be used to tailor the visual color of solids.

Example implementations of the subject matter described herein manages the impact of UV light on synthetic polymers through the selective incorporation of inorganic phosphors in an ink composition that coats the surface of the synthetic polymer. The inorganic phosphors in the ink composition absorb and down convert visible light to provide a brighter appearance to the synthetic polymer material. The brighter appearance is a perceived brightness by a viewer.

The presently disclosed subject matter will now be described more fully hereinafter. However, many modifications and other examples of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to specific examples disclosed and that modifications and other examples are intended to be included within the scope of the appended claims. In other words, the subject matter described herein covers all alternatives, modifications, and equivalents. Indeed, in accordance with the various implementations described herein, such ascertained disinfecting properties and improved photostability are not limited to phosphor-containing inks used in inkjet printing. As would be evident to one of ordinary skill in the art in light of the present disclosure, such disinfecting properties and improved photostability may be employed in a variety of applications other than inkjet printing, or even ink compositions. Indeed, it would frequently be more convenient and otherwise more desirable, for a manufacturer to be able to coat a substrate that the manufacturer has already manufactured rather than, for example, redesign the materials used to manufacture such substrate in order to embed such inorganic phosphors within the materials to impart the desired functionality. For example, in instances wherein a colorant particle has traditionally been used to impart color to a surface, at least a portion of the colorant may be substituted with an inorganic phosphor capable of emitting germicidal radiation to instead impart an anti-microbial/anti-pathogenic functionality to the surface (in lieu of a color). Indeed, the benefits of the phosphor-containing compositions of the present disclosure are not limited to a printing application, as depending on the industry and/or manufacturing needs, the composition can be adjusted to be applied via any number of coating techniques, such as dip coating, spray/aerosolized, roller, or brush-on application. As would be evident to one of ordinary skill in the art, because the inorganic phosphor would be present in a lesser amount compared to the colorant-loading of a pigmented coating, the formulation may be modified and/or rebalanced to support the application in order to result in a stable liquid compatible with the application tools (e.g., paint gun, inkjet printhead, etc.).

Unless otherwise defined, all technical and scientific terms used herein have the same meaning as commonly understood by one of ordinary skill in this field. All publications, patent applications, patents, and other references mentioned herein are incorporated by reference in their entirety. In the event that one or more of the incorporated literatures, patents, and similar materials differs from or contradicts this application, including but not limited to defined terms, term usage, described techniques, or the like, this application controls

I. Definitions

As used herein, "and/or" refers to and encompasses any and all possible combinations of one or more of the associated listed items, as well as the lack of combinations when interpreted in the alternative ("or").

The terms "approximately", "about", "essentially", and "substantially" as used herein represent an amount close to the stated amount that still performs a desired function or achieves a desired result. For example, in some examples, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic.

As used herein, conditional language, such as, among others, "can", "could", "might", "may", "e.g.", and the like, unless specifically stated otherwise or otherwise understood within the context as used, is generally intended to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising", "including", "having", and the like are synonymous and are used inclusively, in an open-ended fashion, and do not exclude additional elements, features, acts, operations, and so forth. The terms, "consisting of", "consist of", and "consists of", respectively, and the like are synonymous and used in a close-ended fashion, and exclude additional elements, features, acts, operations, and so forth. The terms "consisting essentially of", "consist essentially of", "consists essentially of" and the like are synonymous and semi-closed terms that indicate an item in the claim is limited to the components specified in the claim and those that do not materially affect the basic and novel characteristics of the claim. Additionally, the term "or" is used in its inclusive sense (and not in its exclusive sense) so that when used, for example, to connect a list of elements, the term "or" means one, some, or all of the elements in the list.

As used herein, "contacting" refers to contacting a solvent with one or more inorganic phosphor dopants and a binder to prepare an ink composition or contacting one or more inorganic phosphor dopants with one or more photoinitiators and one or more monomers to prepare a UV-curable ink composition. In certain examples, the contacting can be aided by, for example, the application of heat and/or pressure.

As used herein, a "coated surface" or a surface that is "coated" refers to a surface that has been treated with an ink composition disclosed herein and contains at least one layer of the ink composition on its surface. In some examples, a coated surface includes only a single layer of the ink composition disclosed herein. In still other examples, a coated surface refers to multiple layers of ink composition disclosed herein on the surface of a substrate. By way of non-limiting example, a first layer (e.g., an interior layer) of the ink composition may be applied to the surface of a substrate, followed by application of one or more additional layers (e.g., an exterior layer) of the ink composition over the first layer. In still further examples, one or more interior layers in such a multi-layer coated surface may not be exposed to UV light (e.g., activated) unless and until the exterior layer of the ink composition is exposed to UV light such that the exterior layer itself emits light. One or more inorganic phosphor dopants in such interior layer(s) may emit a longer wavelength of light as compared to an exterior layer. In some examples, the one or more inorganic phosphor dopants in such interior layer(s) may emit a longer wavelength of light after absorbing light emitted by an exterior layer. In still further examples, a layer of ink composition on the surface of a coated surface may be of varying thickness. In certain examples, a coated surface and the one or more layers of the ink composition that form the coated surface may be continuous. In still further examples, a coated surface and at least one of the layers of the ink composition that form the coated surface may be discontinuous.

As used herein, "improving color stability" refers to extending the color lifespan of a synthetic polymer material and/or reducing the incidence of yellowing of the synthetic polymer host material caused by exposure to UV light as compared with polymer materials not comprising a coating of an ink composition including one or more inorganic phosphor dopants. As described herein, an ink composition comprising one or more inorganic phosphor dopants can be coated on a synthetic polymer surface. The one or more inorganic phosphor dopants in the ink coating can absorb UV light, thereby reducing the impact that UV absorption has on polymer color stability. In examples, the inorganic phosphor dopants absorb more incident UV light than the synthetic polymer material underneath the ink composition, thereby offsetting photo-oxidation and discoloration of the polymer material.

Such improved color stability can be visually measured using a control synthetic polymer that does not have a coating of an ink composition described herein ("control") and a synthetic polymer that is coated with an ink composition described herein ("test") and allowing both the control and test synthetic polymers to undergo UV exposure. Color changes can be readily perceived by comparing any amount of color change between the control and test samples. For example, a synthetic polymer that has been coated with an ink composition described herein is said to have improved color stability if it exhibits no or significantly less yellowing compared with the control sample that also underwent UV exposure.

Additionally, different phosphors can be mixed in the ink compositions to emit white or off-white visible light, thereby creating a brighter appearance of the polymer material. The concept behind generating white light by mixing phosphors that emit light at different wavelengths is analogous to that observed in generating white light using LEDs, such as demonstrated in FIG. 6. For example, a conventional white light source can be realized by mixing red light, green light and blue light with a suitable intensity ratio. Alternatively, a white light source can be realized by mixing yellow light and blue light with a suitable intensity ratio. Examples are provided herein where phosphors are selected and incorporated into an ink composition to emit light of different colors that then combine to produce white light.

As used herein, "white light" refers to a combination of all wavelengths of electromagnetic radiation in the visible range of the spectrum, where each wavelength is present in an equal amount relative to the other wavelengths. "Off-white" light refers to combinations of wavelengths in the visible range of the electromagnetic radiation that are close to white light, but are not present in equal amounts, for example.

As used herein, "photo-oxidation" refers to degradation of a polymer surface due to the combined action of light and oxygen. Photo-oxidation causes the polymer chains to break, resulting in the material becoming increasingly brittle.

As used herein, the terms "inorganic phosphor dopant" and "phosphor" can be used interchangeably.

As used herein, a "UV curable" ink composition refers to an ink formulation comprising one or more inorganic phosphor dopants; one or more photoinitiators; and one or more monomers, that when exposed to ultraviolet light dries or hardens.

II. Ink Compositions

A. In certain examples, the subject matter described herein is directed to an ink composition (110) comprising: one or more inorganic phosphor dopants (100); a solvent (111); and a binder (112).

In certain examples of the above ink composition (110), the one or more inorganic phosphor dopants (100) have a diameter no greater than 0.5 μm, such that the ink composition (110) is compatible with and may pass through a printer head, for example, to be printed on a surface (101*a*) of a substrate (101). In certain other examples, the one or more inorganic phosphor dopants (100) have sufficiently narrow size distribution. For example, in certain other examples, the one or more inorganic phosphor dopants (100) have a diameter of about 0.01 μm to 0.5 μm, about 0.05 μm to 0.45 μm, about 0.10 μm to 0.3 μm, about 0.2 μm to 0.5 μm, about 0.4 μm to 0.5 μm, about 0.01 μm to 0.2 μm, about 0.2 μm to 0.3 μm, or about 0.35 μm to 0.45 μm. In certain examples, the one or more inorganic phosphor dopants (100) have a diameter of about 0.01 μm, 0.02 μm, 0.03 μm, 0.04 μm, 0.05 μm, 0.06 μm, 0.07 μm, 0.08 μm, 0.09 μm, 0.10 μm, 0.11 μm, 0.12 μm, 0.13 μm, 0.14 μm, 0.15 μm, 0.16 μm, 0.17 μm, 0.18 μm, 0.19 μm, 0.20 μm, 0.21 μm, 0.22 μm, 0.23 μm, 0.24 μm, 0.25 μm, 0.26 μm, 0.27 μm, 0.28 μm, 0.29 μm, 0.30 μm, 0.31 μm, 0.32 μm, 0.33 μm, 0.34 μm, 0.35 μm, 0.36 μm, 0.37 μm, 0.38 μm, 0.39 μm, 0.40 μm, 0.41 μm, 0.42 μm, 0.43 μm, 0.44 μm, 0.45 μm, 0.46 μm, 0.47 μm, 0.48 μm, 0.49 μm, and 0.50 μm. The size of the inorganic phosphor dopant (100) can be measured using, for example, dynamic light scattering (DLS) by ASTM E3247-20 ("Standard Test Method for Measuring the Size of Nanoparticles in Aqueous Media Using Dynamic Light Scattering").

In certain examples of the above ink composition (110), the one or more inorganic phosphor dopants (100) are present in the ink composition (110) in an amount of about 1 to 75% weight, in order to obtain the correct optical density depending on the application of the ink composition (110). In certain other examples, including but not limited to the ink composition (110) being formulated as a graphic inkjet ink composition, the one or more inorganic phosphor dopants (100) are present in the ink composition (110) in an amount of about 1 to 50% weight, about 1 to 25% weight, about 1 to 15% weight, about 1 to 10% weight, about 1 to 5% weight, about 1 to 3% weight, or about 1 to 2% weight. In certain other examples, including but not limited to the ink composition (110) being formulated as a non-graphic ink composition, the one or more inorganic phosphor dopants (100) are present in the ink composition (110) in an amount of about 50 to 75% weight, about 55 to 70% weight, or about 60 to 65% weight. In certain examples, the one or more inorganic phosphor dopants (100) are present in the ink composition (110) in an amount of about 1% weight, 2% weight, 3% weight, 4% weight, 5% weight, 6% weight, 7% weight, 8% weight, 9% weight, 10% weight, 15% weight, 20% weight, 25% weight, 30% weight, 35% weight, 40% weight, 45% weight, 50% weight, 55% weight, 60% weight, 65% weight, 70% weight, and 75% weight.

In certain examples of the above ink composition (110), the one or more inorganic phosphor dopants (100) are capable of emitting photons (105) with a wavelength of light between about 200 nm and 280 nm, 200 nm and 270 nm, about 200 nm and 250 nm, about 225 nm and 250 nm, about 200 nm and 225 nm, about 200 nm and 275 nm, or about 225 nm and 275 nm upon exposure to a UV light source (104).

In certain examples of the above ink composition (110), the one or more inorganic phosphor dopants (100) are each independently selected from the group consisting of a metal oxide (106) and a metal fluoride (108) comprising a rare earth ion (107) selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof. In certain examples of the ink composition (110), the rare earth ion (107) is $Pr^{+3}$. In certain examples of the ink composition (110), the metal oxide (106), in each instance, is selected from the group consisting of silicates, phosphates, borates, oxides, oxynitrides, oxysulfides, and aluminates, or combinations thereof. In certain examples, the silicate is selected from the group consisting of melilite, cyclosilicate, silicate garnet, oxyorthosilicate, and orthosilicate. Nonlimiting examples of silicates include $Sr_2MgSi_2O_7$, $Ca_2Al_2SiO_7$, $SrAl_2O_4$, $MgSiO_3$, $SrSiO_3$, $CdSiO_3$, $Ba_2SiO_4$, $BaMg_2Si_2O_7$, $Ca_2MgSi_2O_7$, $Sr_{0.5}Ca_{1.5}MgSi_2O_7$, $(Ca,Sr)_2MgSi_2O_7$, $Sr_3MgSi_2O_8$, $Sr_2MgSi_2O_7$, $Ca_{0.5}Sr_{1.5}Al_2SiO_7$, $Sr_3Al_{10}SiO_{20}$, and $Y_2SiO_5$. Nonlimiting examples of borates include $YBO_3$ and $CaAl_2B_2O_7$. Nonlimiting examples of oxynitrides include $MSi_2O_2N_2$, wherein M=Ba, Sr, or Ca. Nonlimiting examples of phosphates include $YPO_4$ and $Zn_3(PO_4)_2$. Nonlimiting examples of oxides include CaO, SrO, BaO, $Y_3Ga_5O_{12}$, $NaGdGeO_4$, $Cd_3Al_2Ge_3O_{12}$, $CaTiO_3$, $Ca_{0.8}Zn_{0.2}TiO_3$, and $Ca_2Zn_4Ti_{15}O_{36}$. Nonlimiting examples of oxysulfides include $Y_2O_2S$, $Gd_2O_2S$, and $Sr_5Al_2O_7S$. Nonlimiting examples of aluminates include $MgAl_2O_4$, $CaAl_2O_4$, $SrAl_2O_4$, and $Sr_4Al_{14}O_{25}$. In certain examples of the one or more inorganic phosphor dopants (100), the metal oxide (106) is $Ca_2Al_2SiO_7$ doped with $Pr^{3+}$.

In certain examples of the one or more inorganic phosphor dopants (100), the metal fluoride (108) (host lattice) is selected from the group consisting of $Cs_2NaYF_6$, $NaCeF_4$, $NaYF_4$, and $NaGd_4$. Such metal fluoride (108) hosts are often characterized as having a large bandgap, structural defects that are likely to act as electron traps, and anionic defects, which make them useful for inorganic phosphors. In certain examples, the one or more inorganic phosphor dopants (100) is $Cs_2NaYF_6$ doped with $Pr^{3+}$ ($Cs_2NaYF_6$: $Pr^{3+}$). In an example, the $Pr^{3+}$ substitutes the yttrium ion site in $Cs_2NaYF_6$ in an amount from about 0.3% to about 10%. In other examples, the $Pr^{3+}$ substitutes the yttrium ion site in $Cs_2NaYF_6$ in an amount from about 1% to 5%, 1.5% to 4.5%, 2.5% to 5%, 2% to 7%, 3% to 8%, or 4% to 9%.

In certain examples of the above ink composition (110), the solvent (111) is selected from, but not limited to, alcohols (e.g., methanol, ethanol, propanol, isopropyl alcohol, butanol, polyols, ethylene glycol, glycerine, and PEG, among others), ketones and ketone alcohols (e.g., acetone and diacetone alcohol, among others), ethers (e.g., tetrahydrofuran, dioxane, and alkylethers, among others), ethers of polyhydric alcohols (e.g., ethylene glycol monomethyl ether, ethylene glycol monoethyl ether, ethylene glycol monoethyl ether acetate, di(ethyleneglycol) monomethyl ether), nitrogen-containing solvents (e.g., 2-pyrrolidone, and N-methyl-2-pyrrolidone, among others), sulfur-containing solvents (e.g., 2,2'-thiodiethanol, dimethylsulfoxide, tetramethylene sulfone, and sulfolane, among others), and sugars and derivatives thereof (e.g., glucose, oxyethylene adducts of glycerin, and oxyethylene adducts of diglycerin, among others). In certain examples of the above ink composition (110), the solvent (111) is selected from the group consisting of water, methanol, ethanol, propanol, isopropyl alcohol, butanol, acetone, tetrahydrofuran, dioxane, 2-pyrrolidone, N-methyl-2-pyrrolidone, and dimethylsulfoxide. In certain examples, the solvent (111) is water. In certain other examples, the solvent (111) comprises water and one or more co-solvents, which can be water-soluble, water-miscible, or a combination thereof. Such solvents (111) may be used to affect the flowability of the ink composition (110). For example, in some examples, the use of a solvent (111) is needed to increase the flow of the ink composition (110) if the flow of the ink composition (110) is otherwise insufficient.

In certain examples of the above ink composition (110), the binder (112) is a water-soluble or alcohol-soluble binder. In certain examples, the binder (112) is selected from the group consisting of ethyl cellulose, polymethyl methacrylate, polyurethane, latex, polydimethylsiloxane, and polyvinyl alcohol. In certain examples of the above method, the binder (112) cures by evaporation. In certain examples, the binder (112) has a molecular weight below 100,000 and often below 50,000. In certain examples, the binder (112) comprises one or more of vinyl chloride/vinyl acetate copolymers, acrylics, and polyketones.

In certain examples of the above ink composition (110), the ink composition (110) has a viscosity of about 2 mPa-s to about 30 mPa-s in order to impart sufficient flow to the ink composition (110). In certain examples, the ink composition (110) has a viscosity of about 2 mPa-s to about 25 mPa-s, about 5 mPa-s to about 15 mPa-s, about 10 mPa-s to about 30 mPa-s, about 10 mPa-s to about 20 mPa-s, about 5 mPa-s to about 25 mPa-s, about 7 mPa-s to about 23 mPa-s, about 6 mPa-s to about 27 mPa-s, about 4 mPa-s to about 18 mPa-s, about 12 mPa-s to about 24 mPa-s, or about 18 mPa-s to about 28 mPa-s.

In certain examples of the above ink composition (110), the ink composition (110) is formulated as a paint. In certain other examples of the above ink composition (110), the ink composition (110) is formulated as a dip coating or padding. In still certain other examples of the above ink composition (110), the ink composition (110) is formulated as an aerosol spray. In still further certain other examples of the above ink composition (110), the ink composition (110) is formulated for rotary screen printing.

The preferred amounts and relative ratios of the components (inorganic phosphor dopants (100); solvent (111); and binder (112)) of the ink composition (110) will vary widely based on the intended application of the ink composition (110). For example, in a rotary screen printing process, the manufacturer requires the ink compositions (110) to be non-Newtonian and exhibit high viscosity, which attributes would be incompatible with an inkjet printer.

B. In certain examples, the subject matter described herein is directed to a UV-curable ink composition (113) comprising one or more inorganic phosphor dopants (100), one or more photoinitiators (114), and one or more monomers (115).

UV-curable ink compositions (113) of the present application are compatible with a wide range of substrates (101) and enable easy print head maintenance because the UV-curable ink composition (113) does not solidify until reacted with the correct UV light dosage or wavelength. UV-curable ink compositions (113) of the present application have good durability and are environmentally beneficial as they have near zero VOC's. UV-curable ink compositions (113) of the present application also enable control over applied film layer thickness (i.e., able to be built up by additive printing technique).

In certain examples of the above UV-curable ink composition (113), the one or more inorganic phosphor dopants (100) have a diameter no greater than 0.5 μm, such that the UV-curable ink composition (113) is compatible with and may pass through a printer head, for example, to be printed on a surface (101*a*) of a substrate (101). In certain other examples, the one or more inorganic phosphor dopants (100) have sufficiently narrow size distribution. For example, in certain other examples, the one or more inorganic phosphor dopants (100) have a diameter of about 0.01 μm to 0.5 μm, about 0.05 μm to 0.45 μm, about 0.10 μm to 0.3 μm, about 0.2 μm to 0.5 μm, about 0.4 μm to 0.5 μm, about 0.01 μm to 0.2 μm, about 0.2 μm to 0.3 μm, or about 0.35 μm to 0.45 μm. In certain examples, the one or more inorganic phosphor dopants (100) have a diameter of about 0.01 μm, 0.02 μm, 0.03 μm, 0.04 μm, 0.05 μm, 0.06 μm, 0.07 μm, 0.08 μm, 0.09 μm, 0.10 μm, 0.11 μm, 0.12 μm, 0.13 μm, 0.14 μm, 0.15 μm, 0.16 μm, 0.17 μm, 0.18 μm, 0.19 μm, 0.20 μm, 0.21 μm, 0.22 μm, 0.23 μm, 0.24 μm, 0.25 μm, 0.26 μm, 0.27 μm, 0.28 μm, 0.29 μm, 0.30 μm, 0.31 μm, 0.32 μm, 0.33 μm, 0.34 μm, 0.35 μm, 0.36 μm, 0.37 μm, 0.38 μm, 0.39 μm, 0.40 μm, 0.41 μm, 0.42 μm, 0.43 μm, 0.44 μm, 0.45 μm, 0.46 μm, 0.47 μm, 0.48 μm, 0.49 μm, and 0.50 μm. The size of the inorganic phosphor dopant (100) can be measured using, for example, dynamic light scattering (DLS) by ASTM E3247-20 ("Standard Test Method for Measuring the Size of Nanoparticles in Aqueous Media Using Dynamic Light Scattering").

In certain examples of the above UV-curable ink composition (113), the one or more inorganic phosphor dopants (100) are present in the UV-curable ink composition (113) in an amount of about 1 to 75% weight, in order to obtain the correct optical density depending on the application of the UV-curable ink composition (113). In certain other examples, including but not limited to the UV-curable ink composition (113) being formulated as a graphic inkjet ink composition, the one or more inorganic phosphor dopants (100) are present in the UV-curable ink composition (113) in an amount of about 1 to 50% weight, about 1 to 25% weight, about 1 to 15% weight, about 1 to 10% weight, about 1 to 5% weight, about 1 to 3% weight, or about 1 to 2% weight. In certain other examples, including but not limited to the UV-curable ink composition (113) being formulated as a non-graphic ink composition, the one or more inorganic phosphor dopants (100) are present in the UV-curable ink composition (113) in an amount of about 50 to 75% weight, about 55 to 70% weight, or about 60 to 65% weight. In certain examples, the one or more inorganic phosphor dopants (100) are present in the UV-curable ink composition (113) in an amount of about 1% weight, 2% weight, 3% weight, 4% weight, 5% weight, 6% weight, 7% weight, 8% weight, 9% weight, 10% weight, 15% weight, 20% weight, 25% weight, 30% weight, 35% weight, 40% weight, 45% weight, 50% weight, 55% weight, 60% weight, 65% weight, 70% weight, and 75% weight.

In certain examples of the above UV-curable ink composition (113), the one or more inorganic phosphor dopants (100) are capable of emitting photons (105) with a wavelength of light between about 200 nm and 280 nm, 200 nm and 270 nm, about 200 nm and 250 nm, about 225 nm and 250 nm, about 200 nm and 225 nm, about 200 nm and 275 nm, or about 225 nm and 275 nm upon exposure to a UV light source (104).

In certain examples of the above UV-curable ink composition (113), the one or more inorganic phosphor dopants (100) are each independently selected from the group consisting of a metal oxide (106) and a metal fluoride (108) comprising a rare earth ion (107) selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof. In certain examples of the UV-curable ink composition (113), the rare earth ion (107) is $Pr^{+3}$. In certain examples of the UV-curable ink composition (113), the metal oxide (106), in each instance, is selected from the group consisting of silicates, phosphates, borates, oxides, oxynitrides, oxysulfides, and aluminates, or combinations thereof. In certain examples, the silicate is selected from the group consisting of melilite, cyclosilicate, silicate garnet, oxyorthosilicate, and orthosilicate. Nonlimiting examples of silicates include $Sr_2MgSi_2O_7$, $Ca_2Al_2SiO_7$, $SrAl_2O_4$, $MgSiO_3$, $SrSiO_3$, $CdSiO_3$, $Ba_2SiO_4$, $BaMg_2Si_2O_7$, $Ca_2MgSi_2O_7$, $Sr_{0.5}Ca_{1.5}MgSi_2O_7$, $(Ca,Sr)_2MgSi_2O_7$, $Sr_3MgSi_2O_8$, $Sr_2MgSi_2O_7$, $Ca_{0.5}Sr_{1.5}Al_2SiO_7$, $Sr_3Al_{10}SiO_{20}$, and $Y_2SiO_5$. Nonlimiting examples of borates include $YBO_3$ and $CaAl_2B_2O_7$. Nonlimiting examples of oxynitrides include $MSi_2O_2N_2$, wherein M=Ba, Sr, or Ca. Nonlimiting examples of phosphates include $YPO_4$ and $Zn_3(PO_4)_2$. Nonlimiting examples of oxides include CaO, SrO, BaO, $Y_3Ga_5O_{12}$, $NaGdGeO_4$, $Cd_3Al_2Ge_3O_{12}$, $CaTiO_3$, $Ca_{0.8}Zn_{0.2}TiO_3$, and $Ca_2Zn_4Ti_{15}O_{36}$. Nonlimiting examples of oxysulfides include $Y_2O_2S$, $Gd_2O_2S$, and $Sr_5Al_2O_7S$. Nonlimiting examples of aluminates include $MgAl_2O_4$, $CaAl_2O_4$, $SrAl_2O_4$, and $Sr_4Al_{14}O_{25}$. In certain examples of the one or more inorganic phosphor dopants (100), the metal oxide (106) is $Ca_2Al_2SiO_7$ doped with $Pr^{3+}$.

In certain examples of the one or more inorganic phosphor dopants (100), the metal fluoride (108) (host lattice) is selected from the group consisting of $Cs_2NaYF_6$, $NaCeF_4$, $NaYF_4$, and $NaGd_4$. Such metal fluoride (108) hosts are often characterized as having a large bandgap, structural defects that are likely to act as electron traps, and anionic defects, which make them useful for inorganic phosphors. In certain examples, the one or more inorganic phosphor dopants (100) is $Cs_2NaYF_6$ doped with $Pr^{3+}$($Cs_2NaYF_6$: $Pr^{3+}$). In an example, the $Pr^{3+}$ substitutes the yttrium ion site in $Cs_2NaYF_6$ in an amount from about 0.3% to about 10%. In other examples, the $Pr^{3+}$ substitutes the yttrium ion site in $Cs_2NaYF_6$ in an amount from about 1% to 5%, 1.5% to 4.5%, 2.5% to 5%, 2% to 7%, 3% to 8%, or 4% to 9%.

In certain examples of the above UV-curable ink composition (113), the one or more photoinitiators (114) are each independently selected from the group consisting of 4,4'-bis (dimethylamino)benzophenone, thioxanthen-9-one, 1-hydroxy-cyclohexyl-phenyl-ketone, 2,4-Dinitro-1-naphthol, and diphenyl(2,4,6-trimethylbenzoyl)phosphine oxide (TPO).

In certain examples of the above UV-curable ink composition (113), the one or more monomers (115) are each independently an acrylate monomer. In certain examples of the UV-curable ink composition (113), the one or more monomers (115) are each independently 1,6-hexanediol diacrylate (HDDA), poly(ethylene glycol) diacrylate (PEGDA), 1,3-butyleneglycoldiacrylate, di-trimethylolpropane tetraacrylate, hexanedioldiacrylate, ethoxy(3)cyclohexanol, and/or dimethanoldiacrylate. Such acrylate monomers (115) may be used as binders (112) to improve one or more properties of the UV-curable ink composition (113), such as pigment dispersion, adhesion, chemical resistance, mechanical resistance, UV resistance, and the like. For example, in certain examples of the above method wherein little to no odor is desired, suitable acrylate monomers (115) may include tridecyl acrylate (8 mPas at 25° C.), caprolactone acrylate (75 mPas at 25° C.), ethoxylated(4) phenol acrylate (35 mPas at 25° C.), ethoxylated(4) nonyl phenol acrylate (90 mPas at 25° C.), and/or cyclic trimethylolpropane formal acrylate (12 mPas at 25° C.).

In certain examples of the above method wherein moderate to high flexibility is desired (e.g., to apply printed film on contoured surfaces (101*a*) and resist cracking), suitable acrylate monomers (115) may include ethoxylated(4)phenolacrylate (35 mPas at 25° C.), polyethylene glycol (200) diacrylate (25 mPas at 25° C.)(very flexible), propoxylated (3) trimethylolpropane triacrylate (100 mPas at 25° C.), and/or ethoxylated(3) trimethylolpropane triacrylate (70 mPas at 25° C.) (higher ethoxylates up to 15(EO); more flexibility, less odor).

In certain other examples of the above method wherein moderate hardness is desired (e.g., to resist abrasion, scrapes and scratches), suitable acrylate monomers (115) may include tricyclodecane dimethanol diacrylate (120 mPas at 25° C.).

In certain other examples of the above method wherein moderate toughness is desired (e.g., to resist fracturing by impacts), suitable acrylate monomers (115) may include isobornyl acrylate (10 mPas at 25° C.) (very tough), isophoryl acrylate (6 mPas at 25° C.) (high impact strength), 2-phenoxyethylacrylate(2-PEA) (10 mPas at 25° C.), dioxane glycol diacrylate (250 mPas at 25° C.), ethoxylated bisphenol A diacrylate (1500 mPas at 25° C.) (very tough), and/or trimethylolpropane triacrylate (110 mPas at 25° C.).

In certain other examples of the above method wherein good adhesion is desired (e.g., resists removal from various substrates), suitable acrylate monomers (115) may include diethylene glycol butyl ether acrylate (5 mPas at 25° C.), 2(2-Ethoxyethoxy)ethylacrylate (5 mPas at 25° C.), tetrahydrofurfuryl acrylate (5 mPas at 25° C.), isobornyl acrylate (10 mPas at 25° C.), cyclic trimethylolpropane formal acrylate (12 mPas at 25° C.), 2-phenoxyethylacrylate(2-PEA) (10 mPas at 25° C.), hexanediol diacrylate (7 mPas at 25° C.), tricyclodecane dimethanol diacrylate (120 mPas at 25° C.) Highly versatile: dioxane glycol diacrylate (250 mPas at 25° C.), and/or propoxylated(2) neopentyl glycol diacrylate (18 mPas at 25° C.)

In certain other examples of the above method wherein good wetting is desired (e.g., to develop good printed film quality/uniformity), suitable acrylate monomers (115) may include isodecyl acrlyate (10 mPas at 25° C.), octyl/decyl acrylate (10 mPas at 25° C.), propoxylated(2) neopentyl glycol diacrylate (18 mPas at 25° C.) (excellent pigment wetting), and/or propoxylated(3) trimethylolpropane triacrylate (100 mPas at 25° C.).

In certain other examples of the above method, acrylate monomers (115) may be selected to impart sufficiently low viscosity (e.g., to be able to jet from a piezo head; heuristic 25 cP at 25-45° C.) and/or chemical resistance (e.g., to withstand degradation from exposure to any number of commercially available surface cleaners and disinfectants as, for examples, an airline operator may use.

In certain examples of the above UV-curable ink composition (113), the UV-curable ink composition (113) further comprises one or more additives for reducing surface tension and/or improving substrate wetting. By reducing surface tension, properties such as droplet formation and substrate wetting may be improved. In certain examples of the above UV-curable ink composition (113), the one or more additives are selected from the group consisting of alkoxylated, silicone, silicone-acrylated surfactants, and fluorocarbons.

In certain examples of the above UV-curable ink composition (113), the UV-curable ink composition (113) has a viscosity of about 5 mPa-s to about 35 mPa-s. In certain examples, the UV-curable ink composition (113) has a viscosity of about 5 mPa-s to about 25 mPa-s, about 5 mPa-s to about 20 mPa-s, about 5 mPa-s to about 15 mPa-s, about 10 mPa-s to about 30 mPa-s, about 7 mPa-s to about 24 mPa-s, about 10 mPa-s to about 27 mPa-s, about 12 mPa-s to about 22 mPa-s, about 15 mPa-s to about 30 mPa-s, about 8 mPa-s to about 28 mPa-s, about 9 mPa-s to about 23 mPa-s, about 14 mPa-s to about 25 mPa-s, or about 13 mPa-s to about 26 mPa-s.

In certain examples of the above UV-curable ink composition (113), the UV-curable ink composition (113) is formulated as a paint. In certain other examples of the above UV-curable ink composition (113), the UV-curable ink composition (113) is formulated as a dip coating or padding. In still certain other examples of the above UV-curable ink composition (113), the UV-curable ink composition (113) is formulated as an aerosol spray. In still further certain other examples of the above UV-curable ink composition (113), the UV-curable ink composition (113) is formulated for rotary screen printing.

The preferred amounts and relative ratios of the components (inorganic phosphor dopant(s) (100), photoinitiator(s) (114), and monomer(s) (115)) of the UV-curable ink composition (113) will vary widely depending on the intended application of the UV-curable ink composition (113). For example, in a rotary screen printing process, the manufacturer requires the UV-curable ink compositions (113) to be non-Newtonian and exhibit high viscosity, which attributes would be incompatible with an inkjet printer.

III. Methods of Making the Ink Compositions

Methods for preparing inorganic phosphor dopants (100) are known in the art. See, for example, Broxtermann et al. *ECS Journal of Solid State Science and Technology,* 6 (4) R47-R52 (2017); and Poelman et al. *Journal of Applied Physics* 128, 240903 (2020). In examples, metal oxide (106) host materials and rare earth oxides are weighed out such that an amount of rare earth ion (107) is substituted or doped into the metal oxide (106) lattice. The amount of rare earth ion (107) to be added can be determined by calculating the proposed stoichiometry of the material and then weighing out appropriate amounts of starting materials using dimensional analysis. The metal oxide (106) powders are intimately ground up using a mortar and pestle in order to maximize contact between the particles in the mixture. Once placed in a suitable crucible (often alumina), the mixture is heated in a tube or muffle furnace up to a temperature, sufficient to induce a solid state reaction, but below the melting temperature of the final compound. From a temperature around 200-300° C. below this melting temperature, there is a strong increase in the grain size of the final compound. This heating process is called sintering, which typically leads to very a dense and strongly agglomerated material. This material is not directly applicable as a phosphor. Therefore, post-synthesis grinding-manually or using a ball mill—is often required.

Ball milling is a mechanical method whereby particles are reduced in size by mechanical impact and friction. Typically, powders are placed in a grinding jar, together with a number of hard grinding balls (often $Al_2O_3$ or $ZrO_2$) and a solvent so that a slurry is obtained. The grinding jar is then moved in order to achieve maximum friction. Similar to the case of manual grinding using a mortar and pestle, the effect of the process is highly dependent on the size and hardness of the starting material.

For the solid-state synthesis described above, the atmosphere used for heating can vary depending on the host material. In the case of oxides, air can usually be applied. However, some dopants, notably europium, can be oxidized in an oxygen lattice while heating in oxygen, leading to the formation of fully oxidized $Eu^{3+}$ dopants. If $Eu^{2+}$ is the preferred valence state of this dopant, then it can be necessary to perform an additional thermal treatment in a reducing atmosphere, such as helium or argon.

Other methods for preparing inorganic phosphor dopants (100) include sol-gel synthesis, colloidal synthesis, and co-precipitation. In a sol-gel process, for example, the powders are weighed out and dissolved in concentrated acid, such as $HNO_3$ (such as 70% w/w), and then diluted with deionized water. This solution may then be cooled to room-temperature and added dropwise to a cold-saturated aqueous solution of another acid, such as oxalic acid. A solid material will then be allowed to precipitate and then washed with deionized water and other polar solvents (such as acetone, acetonitrile, dimethylformamide (DMF), dimethylsulfoxide (DMSO), isopropanol, or methanol). The solid material will then undergo calcination at a temperature of about 1000° C. to 1200° C. for several hours, followed by intermittent grinding and sintering. In certain examples, after weighing and mixing, the metal oxide (106) host powder and rare earth oxide powder are directly placed in a furnace at 1000-1100° C. for 2-48 hours.

As depicted in FIGS. 1 and 2, for example, once the one or more inorganic phosphor dopants (100) are prepared, they are used to formulate the ink compositions (110) and/or UV-curable ink compositions (113), as explained below.

A. In certain examples, the subject matter described herein is directed to a method of making an ink composition (110) comprising one or more inorganic phosphor dopants (100); a solvent (111); and a binder (112), the method comprising: preparing one or more inorganic phosphor dopants (100) in Step 150; and contacting a solvent (111) with one or more inorganic phosphor dopants (100) and a binder (112) to prepare the ink composition (110) in Step 155 as further depicted in FIG. 1.

In certain examples of the above method, the one or more inorganic phosphor dopants (100) have a diameter no greater than 0.5 μm, such that the ink composition (110) are compatible with and may pass through a printer head, for example, to be printed on a surface (101*a*) of a substrate (101). In certain other examples, the one or more inorganic phosphor dopants (100) have sufficiently narrow size distribution. For example, in certain other examples of the above method, the one or more inorganic phosphor dopants (100) have a diameter of about 0.01 μm to 0.5 μm, about 0.05 μm to 0.45 μm, about 0.10 μm to 0.3 μm, about 0.2 μm to 0.5 μm, about 0.4 μm to 0.5 μm, about 0.01 μm to 0.2 μm, about 0.2 μm to 0.3 μm, or about 0.35 μm to 0.45 μm. In certain examples, the one or more inorganic phosphor dopants (100) have a diameter of about 0.01 μm, 0.02 μm, 0.03 μm, 0.04 μm, 0.05 μm, 0.06 μm, 0.07 μm, 0.08 μm, 0.09 μm, 0.10 μm, 0.11 μm, 0.12 μm, 0.13 μm, 0.14 μm, 0.15 μm, 0.16 μm, 0.17 μm, 0.18 μm, 0.19 μm, 0.20 μm, 0.21 μm, 0.22 μm, 0.23 μm, 0.24 μm, 0.25 μm, 0.26 μm, 0.27 μm, 0.28 μm, 0.29 μm, 0.30 μm, 0.31 μm, 0.32 μm, 0.33 μm, 0.34 μm, 0.35 μm, 0.36 μm, 0.37 μm, 0.38 μm, 0.39 μm, 0.40 μm, 0.41 μm, 0.42 μm, 0.43 μm, 0.44 μm, 0.45 μm, 0.46 μm, 0.47 μm, 0.48 μm, 0.49 μm, and 0.50 μm. The size of the inorganic phosphor dopant (100) can be measured using, for example, dynamic light scattering (DLS) by ASTM E3247-20 ("Standard Test Method for Measuring the Size of Nanoparticles in Aqueous Media Using Dynamic Light Scattering").

In certain examples of the above method, the one or more inorganic phosphor dopants (100) are capable of emitting photons (105) with a wavelength of light between about 200 nm and 280 nm, 200 nm and 270 nm, about 200 nm and 250 nm, about 225 nm and 250 nm, about 200 nm and 225 nm, about 200 nm and 275 nm, or about 225 nm and 275 nm upon exposure to a UV light source (104).

In certain examples of the above method, the one or more inorganic phosphor dopants (100) are each independently selected from the group consisting of a metal oxide (106) and a metal fluoride (108) comprising a rare earth ion (107) selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof. In certain examples of the above method, the rare earth ion (107) is $Pr^{+3}$. In certain examples of the above method, the metal oxide (106), in each instance, is selected from the group consisting of silicates, phosphates, borates, oxides, oxynitrides, oxysulfides, and aluminates, or combinations thereof. In certain examples, the silicate is selected from the group consisting of melilite, cyclosilicate, silicate garnet, oxyorthosilicate, and orthosilicate. Nonlimiting examples of silicates include $Sr_2MgSi_2O_7$, $Ca_2Al_2SiO_7$, $SrAl_2O_4$, $MgSiO_3$, $SrSiO_3$, $CdSiO_3$, $Ba_2SiO_4$, $BaMg_2Si_2O_7$, $Ca_2MgSi_2O_7$, $Sr_{0.5}Ca_{1.5}MgSi_2O_7$, $(Ca,Sr)_2MgSi_2O_7$, $Sr_3MgSi_2O_8$, $Sr_2MgSi_2O_7$, $Ca_{0.5}Sr_{1.5}Al_2SiO_7$, $Sr_3Al_{10}SiO_{20}$, and $Y_2SiO_5$. Nonlimiting examples of borates include $YBO_3$ and $CaAl_2B_2O_7$. Nonlimiting examples of oxynitrides include $MSi_2O_2N_2$, wherein M=Ba, Sr, or Ca. Nonlimiting examples of phosphates include $YPO_4$ and $Zn_3(PO_4)_2$. Nonlimiting examples of oxides include CaO, SrO, BaO, $Y_3Ga_5O_{12}$, $NaGdGeO_4$, $Cd_3Al_2Ge_3O_{12}$, $CaTiO_3$, $Ca_{0.8}Zn_{0.2}TiO_3$, and $Ca_2Zn_4Ti_{15}O_{36}$. Nonlimiting examples of oxysulfides include $Y_2O_2S$, $Gd_2O_2S$, and $Sr_5Al_2O_7S$. Nonlimiting examples of aluminates include $MgAl_2O_4$, $CaAl_2O_4$, $SrAl_2O_4$, and $Sr_4Al_{14}O_{25}$. In certain examples of the one or more inorganic phosphor dopants (100), the metal oxide (106) is $Ca_2Al_2SiO_7$ doped with $Pr^{3+}$.

In certain examples of the one or more inorganic phosphor dopants (100), the metal fluoride (108) (host lattice) is selected from the group consisting of $Cs_2NaYF_6$, $NaCeF_4$, $NaYF_4$, and $NaGd_4$. Such metal fluoride (108) hosts are often characterized as having a large bandgap, structural defects that are likely to act as electron traps, and anionic defects, which make them useful for inorganic phosphors. In certain examples, the one or more inorganic phosphor dopants (100) is $Cs_2NaYF_6$ doped with $Pr^{3+}$ ($Cs_2NaYF_6$: $Pr^{3+}$). In an example, the $Pr^{3+}$ substitutes the yttrium ion site in $Cs_2NaYF_6$ in an amount from about 0.3% to about 10%. In other examples, the $Pr^{3+}$ substitutes the yttrium ion site in $Cs_2NaYF_6$ in an amount from about 1% to 5%, 1.5% to 4.5%, 2.5% to 5%, 2% to 7%, 3% to 8%, or 4% to 9%.

In certain examples of the above method, the one or more inorganic phosphor dopants (100) are present in the ink composition (110) in an amount of about 1 to 75% weight, to obtain the correct optical density depending on the application of the ink composition (110). In certain other examples, including but not limited to the ink composition (110) being formulated as a graphic inkjet ink composition, the one or more inorganic phosphor dopants (100) are present in the ink composition (110) in an amount of about 1 to 50% weight, about 1 to 25% weight, about 1 to 15% weight, about 1 to 10% weight, about 1 to 5% weight, about 1 to 3% weight, or about 1 to 2% weight. In certain other examples, including but not limited to the ink composition (110) being formulated as a non-graphic ink composition, the one or more inorganic phosphor dopants (100) are present in the ink composition (110) in an amount of about 50 to 75% weight, about 55 to 70% weight, or about 60 to 65% weight. In certain examples, the one or more inorganic phosphor dopants (100) are present in the ink composition (110) in an amount of about 1% weight, 2% weight, 3% weight, 4% weight, 5% weight, 6% weight, 7% weight, 8% weight, 9% weight, 10% weight, 15% weight, 20% weight, 25% weight, 30% weight, 35% weight, 40% weight, 45% weight, 50% weight, 55% weight, 60% weight, 65% weight, 70% weight, and 75% weight.

Several suitable solvents (111) are set forth in, for example, S. Magdassi, Chemistry of Inkjet Inks (2009). In certain examples of the above method, the solvent (111) is selected from, but not limited to, alcohols (e.g., methanol, ethanol, propanol, isopropyl alcohol, butanol, polyols, ethylene glycol, glycerine, and PEG, among others), ketones and ketone alcohols (e.g., acetone and diacetone alcohol, and cyclohexanone and isophorone, which comprise higher boiling points, among others), ethers (e.g., tetrahydrofuran, dioxane, and alkylethers, among others), ethers of polyhydric alcohols (e.g., ethylene glycol ethers, propylene glycol ethers, ethylene glycol monomethyl ether, ethylene glycol monoethyl ether, ethylene glycol monoethyl ether acetate, di(ethyleneglycol) monomethyl ether), nitrogen-containing solvents (e.g., 2-pyrrolidone, and N-methyl-2-pyrrolidone, among others), esters of these ethers, sulfur-containing solvents (e.g., 2,2'-thiodiethanol, dimethylsulfoxide, tetramethylene sulfone, and sulfolane, among others), alkyl lactates, and sugars and derivatives thereof (e.g., glucose, oxyethylene adducts of glycerin, and oxyethylene adducts of diglycerin, among others). In certain examples of the above ink composition (110), the solvent (111) is selected from the group consisting of water, methanol, ethanol, propanol, isopropyl alcohol, butanol, acetone, tetrahydrofuran, dioxane, 2-pyrrolidone, N-methyl-2-pyrrolidone, and dimethylsulfoxide. In certain examples, the solvent (111) is water. In certain other examples, the solvent (111) comprises water and one or more co-solvents, which can be water-soluble, water-miscible, or a combination thereof. For ink compositions (110) formulated for use in inkjet printing, a solvent (111) or blend of solvents (111) is desired whereby the ink composition (110) dries quickly enough after being printed on the substrate (101), but not so quickly so as to allow ink to dry in the printhead nozzles. According to S. Magdassi, solvents (111) will typically have an evaporation rate in the range of medium (0.8-3) or slow (<0.3 on a scale where n-butyl acetate=1).

In certain examples, the one or more solvents (111) are preferably present in the ink composition (110) in an amount of about 1 to 99% weight. Where a mixture of solvents (111) is used, the mixture can contain any suitable proportion of the solvents (111). Such solvents (111) may be used to affect the viscosity, diffusion, and evaporation rate of the ink composition (110). For example, in some examples, the use of a solvent (111) is needed to decrease the viscosity of the ink composition (110) if the flow of the ink composition (110) is otherwise insufficient. In certain other examples, including but not limited to ink compositions (110) formulated for use in inkjet printing, the one or more solvents (111) are present in the ink composition (110) in an amount of about 50 to 99% weight, 50 to 90% weight, about 50 to 85% weight, or about 60 to about 85% weight. In certain other examples, including but not limited to ink compositions (110) formulated as a non-graphic ink composition, the one or more solvents (111) are present in the ink composition (110) in an amount of about 25 to 50% weight, about 30 to 45% weight, or about 35 to 40% weight. In certain examples, the one or more solvents (111) are present in the ink composition (110) in an amount of about 10% weight, 20% weight, 25% weight, 30% weight, 35% weight, 40% weight, 45% weight, 50% weight, 55% weight, 60% weight, 65% weight, 70% weight, 75% weight, 80% weight, 85% weight, 90% weight, 95% weight, 98% weight, and 99% weight. In certain examples of the above method, the ink composition (110) has a viscosity of about 2 mPa-s to about 30 mPa-s. In certain examples, the ink composition (110) has a viscosity of about 2 mPa-s to about 25 mPa-s, about 5 mPa-s to about 15 mPa-s, about 10 mPa-s to about 30 mPa-s, about 10 mPa-s to about 20 mPa-s, about 5 mPa-s to about 25 mPa-s, about 7 mPa-s to about 23 mPa-s, about 6 mPa-s to about 27 mPa-s, about 4 mPa-s to about 18 mPa-s, about 12 mPa-s to about 24 mPa-s, or about 18 mPa-s to about 28 mPa-s.

In certain examples of the above method, the binder (112) is a water-soluble or alcohol-soluble binder. In certain examples, the binder (112) is selected from the group consisting of ethyl cellulose, polymethyl methacrylate, polyurethane, latex, polydimethylsiloxane, and polyvinyl alcohol. In certain other examples, acrylates of varying functionality and share are used to form the binder (112). In certain examples of the above ink composition (110), the binder (112) is an important constituent impacting the film properties of the application, e.g., airplane wallpaper graphics and protective varnishes. In certain examples of the above method, the binder (112) cures by evaporation. In certain examples, the binder (112) is responsible for retaining and binding the pigment and/or inorganic phosphor dopant (100) to the surface (101*a*) after printing, coating, or otherwise applying the ink composition (110) to the surface (101*a*) and curing.

In certain examples, the one or more binders (112) are preferably present in the ink composition (110) in an amount of about 1 to 25% weight. Where a mixture of binders (112) is used, the mixture can contain any suitable proportion of the binders (112). In certain examples, the one or more binders (112) are present in the ink composition (110) in an amount of about 5 to 25% weight, 10 to 20% weight, or about 15 to 18% weight. In certain examples, the one or more binders (112) are present in the ink composition (110) in an amount of about 1% weight, 3% weight, 5% weight, 10% weight, 15% weight, 18% weight, 20% weight, and 25% weight.

In certain examples, the solvent (111) is contacted with the one or more prepared inorganic phosphor dopant(s) (100) and the binder (112). In certain examples of the above method, the one or more inorganic phosphor dopants (100) are in powder form and are combined with the solvent (111) and the binder (112). The one or more inorganic phosphor dopants (100), the solvent (111), and the binder (112) are then mixed to form the ink composition (110).

B. In certain examples, the subject matter described herein is directed to a method of making a UV-curable ink composition (113) comprising one or more inorganic phosphor dopants (100); one or more photoinitiators (114); and one or more monomers (115), the method comprising: preparing one or more inorganic phosphor dopants (100) in Step 250; and contacting the one or more inorganic phosphor dopants (100) with one or more photoinitiators (114) and one or more monomers (115) to prepare the UV-curable ink composition (113) in Step 255 as further depicted in FIG. 2.

In certain examples of the above method, the one or more inorganic phosphor dopants (100) have a diameter no greater than 0.5 μm, such that the UV-curable ink composition (113) is compatible with and may pass through a printer head, for example, to be printed on a surface (101*a*) of a substrate (101). In certain other examples, the one or more inorganic phosphor dopants (100) have sufficiently narrow size distribution. For example, in certain other examples, the one or more inorganic phosphor dopants (100) have a diameter of about 0.01 μm to 0.5 μm, about 0.05 μm to 0.45 μm, about 0.10 μm to 0.3 μm, about 0.2 μm to 0.5 μm, about 0.4 μm to 0.5 μm, about 0.01 μm to 0.2 μm, about 0.2 μm to 0.3 μm, or about 0.35 μm to 0.45 μm. In certain examples, the one or more inorganic phosphor dopants (100) have a diameter of about 0.01 μm, 0.02 μm, 0.03 μm, 0.04 μm, 0.05 μm, 0.06 μm, 0.07 μm, 0.08 μm, 0.09 μm, 0.10 μm, 0.11 μm, 0.12 μm, 0.13 μm, 0.14 μm, 0.15 μm, 0.16 μm, 0.17 μm, 0.18 μm, 0.19 μm, 0.20 μm, 0.21 μm, 0.22 μm, 0.23 μm, 0.24 μm, 0.25 μm, 0.26 μm, 0.27 μm, 0.28 μm, 0.29 μm, 0.30 μm, 0.31 μm, 0.32 μm, 0.33 μm, 0.34 μm, 0.35 μm, 0.36 μm, 0.37 μm, 0.38 μm, 0.39 μm, 0.40 μm, 0.41 μm, 0.42 μm, 0.43 μm, 0.44 μm, 0.45 μm, 0.46 μm, 0.47 μm, 0.48 μm, 0.49 μm, and 0.50 μm. The size of the inorganic phosphor dopant (100) can be measured using, for example, dynamic light scattering (DLS) by ASTM E3247-20 ("Standard Test Method for Measuring the Size of Nanoparticles in Aqueous Media Using Dynamic Light Scattering").

In certain examples of the above method, the one or more inorganic phosphor dopants (100) are capable of emitting photons (105) with a wavelength of light between about 200 nm and 280 nm, 200 nm and 270 nm, about 200 nm and 250 nm, about 225 nm and 250 nm, about 200 nm and 225 nm, about 200 nm and 275 nm, or about 225 nm and 275 nm upon exposure to a UV light source (104).

In certain examples of the above method, the one or more inorganic phosphor dopants (100) are present in the UV-curable ink composition (113) in an amount of about 1 to 75% weight, to obtain the correct optical density depending on the application of the UV-curable ink composition (113). In certain other examples, including but not limited to the UV-curable ink composition (113) being formulated as a graphic inkjet ink composition, the one or more inorganic phosphor dopants (100) are present in the UV-curable ink composition (113) in an amount of about 1 to 50% weight, about 1 to 25% weight, about 1 to 15% weight, about 1 to 10% weight, about 1 to 5% weight, about 1 to 3% weight, or about 1 to 2% weight. In certain other examples, including but not limited to the UV-curable ink composition (113) being formulated as a non-graphic ink composition, the one or more inorganic phosphor dopants (100) are present in the UV-curable ink composition (113) in an amount of about 50 to 75% weight, about 55 to 70% weight, or about 60 to 65% weight. In certain examples, the one or more inorganic phosphor dopants (100) are present in the UV-curable ink composition (113) in an amount of about 1% weight, 2% weight, 3% weight, 4% weight, 5% weight, 6% weight, 7% weight, 8% weight, 9% weight, 10% weight, 15% weight, 20% weight, 25% weight, 30% weight, 35% weight, 40% weight, 45% weight, 50% weight, 55% weight, 60% weight, 65% weight, 70% weight, and 75% weight.

Several suitable photoinitiators (114) are set forth in, for example, S. Magdassi, Chemistry of Inkjet Inks; Chapter 10: Raw Materials for UV Curable Inks (2009) and W. Zapka, Handbook of Industrial Inkjet Printing: A Full System Approach, Section 4.2 Photoinitiators. In certain examples of the above method, the one or more photoinitiators (114) are each independently selected from the group consisting of 4,4'-bis(dimethylamino)benzophenone, thioxanthen-9-one, 1-hydroxy-cyclohexyl-phenyl-ketone, 2,4-Dinitro-1-naphthol, monoacyl phosphine oxide (Lucerin TPO), diphenyl (2,4,6-trimethylbenzoyl)phosphine oxide (TPO), azobisisobutyronitrile (AIBN), benzyl dimethyl ketal (BDK, Irgacure 651), 2-hydroxy-methyl-1-phenyl propane (Darocure 1173), hydroxycyclohexylphenylketone, (HCPK, Irgacure 184), Irgacure 907, Irgacure 369, Esacure KIP150, monoacylphosphine oxides (MAPO) and bisacylphosphine oxide photoinitiators (BAPO).

In certain examples, the one or more photoinitiators (114) are preferably present in the UV-curable ink composition (113) in an amount of about 0.1 to 15% weight, in order to produce sufficient unpaired electrons or radicals which help to polymerize monomers (115). Where a mixture of photoinitiators (114) is used, the mixture can contain any suitable proportion of the photoinitiators (114).

In certain examples of the above method, the one or more monomers (115) are each independently an acrylate monomer. In certain examples of the above method, the one or more monomers (115) are each independently 1,6-hexanediol diacrylate (HDDA), poly(ethylene glycol) diacrylate (PEGDA), 1,3-butyleneglycoldiacrylate, di-trimethylolpropane tetraacrylate, hexanedioldiacrylate, ethoxy(3)cyclohexanol, and/or dimethanoldiacrylate. Such acrylate monomers (115) may be used as binders (112) to improve one or more properties of the UV-curable ink composition (113), such as pigment dispersion, adhesion, chemical resistance, mechanical resistance, UV resistance, and the like. For example, in certain examples of the above method wherein little to no odor is desired, suitable acrylate monomers (115) may include tridecyl acrylate (8 mPas at 25° C.), caprolactone acrylate (75 mPas at 25° C.), ethoxylated(4) phenol acrylate (35 mPas at 25° C.), ethoxylated(4) nonyl phenol acrylate (90 mPas at 25° C.), and/or cyclic trimethylolpropane formal acrylate (12 mPas at 25° C.).

In certain examples of the above method wherein moderate to high flexibility is desired (e.g., to apply printed film on contoured surfaces and resist cracking), suitable acrylate monomers (115) may include ethoxylated(4)phenolacrylate (35 mPas at 25° C.), polyethylene glycol (200) diacrylate (25 mPas at 25° C.)(very flexible), propoxylated(3) trimethylolpropane triacrylate (100 mPas at 25° C.), and/or ethoxylated(3) trimethylolpropane triacrylate (70 mPas at 25° C.) (higher ethoxylates up to 15(EO); more flexibility, less odor).

In certain other examples of the above method wherein moderate hardness is desired (e.g., to resist abrasion, scrapes and scratches), suitable acrylate monomers (115) may include tricyclodecane dimethanol diacrylate (120 mPas at 25° C.).

In certain other examples of the above method wherein moderate toughness is desired (e.g., to resist fracturing by impacts), suitable acrylate monomers (115) may include isobornyl acrylate (10 mPas at 25° C.) (very tough), isophoryl acrylate (6 mPas at 25° C.) (high impact strength), 2-phenoxyethylacrylate(2-PEA) (10 mPas at 25° C.), dioxane glycol diacrylate (250 mPas at 25° C.), ethoxylated bisphenol A diacrylate (1500 mPas at 25° C.) (very tough), and/or trimethylolpropane triacrylate (110 mPas at 25° C.).

In certain other examples of the above method wherein good adhesion is desired (e.g., resists removal from various substrates (101)), suitable acrylate monomers (115) may include diethylene glycol butyl ether acrylate (5 mPas at 25° C.), 2(2-Ethoxyethoxy)ethylacrylate (5 mPas at 25° C.), tetrahydrofurfuryl acrylate (5 mPas at 25° C.), isobornyl acrylate (10 mPas at 25° C.), cyclic trimethylolpropane formal acrylate (12 mPas at 25° C.), 2-phenoxyethylacrylate (2-PEA) (10 mPas at 25° C.), hexanediol diacrylate (7 mPas at 25° C.), tricyclodecane dimethanol diacrylate (120 mPas at 25° C.) Highly versatile: dioxane glycol diacrylate (250 mPas at 25° C.), and/or propoxylated(2) neopentyl glycol diacrylate (18 mPas at 25° C.).

In certain other examples of the above method wherein good wetting is desired (e.g., to develop good printed film quality/uniformity), suitable acrylate monomers (115) may include isodecyl acrlyate (10 mPas at 25° C.), octyl/decyl acrylate (10 mPas at 25° C.), propoxylated(2) neopentyl glycol diacrylate (18 mPas at 25° C.) (excellent pigment wetting), and/or propoxylated(3) trimethylolpropane triacrylate (100 mPas at 25° C.).

In certain other examples of the above method, acrylate monomers (115) may be selected to impart sufficiently low viscosity (e.g., to be able to jet from a piezoelectric print head with viscosity between 6 cP and 25 cP, for example, at 25-60° C. depending on the head manufacturer specifications) and/or chemical resistance (e.g., to withstand degradation from exposure to any number of commercially available surface cleaners and disinfectants as, for examples, an airline operator may use).

As would be evident to one of ordinary skill in the art in light of the present disclosure, the functionality of an acrylate will have an effect on various ink properties of an UV-curable ink composition (113). For example, as set forth in W. Zapka, Handbook of Industrial Inkjet Printing: A Full System Approach, the effect on each of ink viscosity, reactivity, hardness, solvent resistance, and brittleness increases as the acrylate functionality increases from mono- to penta-. The effect on flexibility of the UV-curable ink composition (113) decreases as the acrylate functionality increases from mono- to penta- and the effect on shrinkage of the UV-curable ink composition (113) is lowest with mono-acrylate functionality, highest with tri-acrylate functionality, and medium at penta-acrylate functionality.

In certain examples of the above method, the method further comprises contacting one or more additives with the one or more inorganic phosphor dopants (100) with one or more photoinitiators (114) and one or more monomers (115). In certain examples, the one or more additives are for reducing surface tension and/or improving substrate wetting. By reducing surface tension, properties such as droplet formation and substrate wetting may be improved. In certain examples of the above UV-curable ink composition (113), the one or more additives are selected from the group consisting of alkoxylated, silicone, silicone-acrylated surfactants, and fluorocarbons.

In certain examples of the above method, the UV-curable ink composition (113) has a viscosity of about 5 mPa-s to about 35 mPa-s. In certain examples of the above method, the UV-curable ink composition (113) has a viscosity of about 5 mPa-s to about 25 mPa-s, about 5 mPa-s to about 20 mPa-s, about 5 mPa-s to about 15 mPa-s, about 10 mPa-s to about 30 mPa-s, about 7 mPa-s to about 24 mPa-s, about 10 mPa-s to about 27 mPa-s, about 12 mPa-s to about 22 mPa-s, about 15 mPa-s to about 30 mPa-s, about 8 mPa-s to about 28 mPa-s, about 9 mPa-s to about 23 mPa-s, about 14 mPa-s to about 25 mPa-s, or about 13 mPa-s to about 26 mPa-s.

In certain examples of the above method, the one or more inorganic phosphor dopants (100) are each independently selected from the group consisting of a metal oxide (106) and a metal fluoride (108) comprising a rare earth ion (107) selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof. In certain examples of the above method, the rare earth ion (107) is $Pr^{+3}$. In certain examples of the above method, the metal oxide (106), in each instance, is selected from the group consisting of silicates, phosphates, borates, oxides, oxynitrides, oxysulfides, and aluminates, or combinations thereof. In certain examples, the silicate is selected from the group consisting of melilite, cyclosilicate, silicate garnet, oxy-orthosilicate, and orthosilicate. Nonlimiting examples of silicates include $Sr_2MgSi_2O_7$, $Ca_2Al_2SiO_7$, $SrAl_2O_4$, $MgSiO_3$, $SrSiO_3$, $CdSiO_3$, $Ba_2SiO_4$, $BaMg_2Si_2O_7$, $Ca_2MgSi_2O_7$, $Sr_{0.5}Ca_{1.5}MgSi_2O_7$, $(Ca,Sr)_2MgSi_2O_7$, $Sr_3MgSi_2O_8$, $Sr_2MgSi_2O_7$, $Ca_{0.5}Sr_{1.5}Al_2SiO_7$, $Sr_3Al_{10}SiO_{20}$, and $Y_2SiO_5$. Nonlimiting examples of borates include $YBO_3$ and $CaAl_2B_2O_7$. Nonlimiting examples of oxynitrides include $MSi_2O_2N_2$, wherein M=Ba, Sr, or Ca. Nonlimiting examples of phosphates include $YPO_4$ and $Zn_3(PO_4)_2$. Nonlimiting examples of oxides include CaO, SrO, BaO, $Y_3Ga_5O_{12}$, $NaGdGeO_4$, $Cd_3Al_2Ge_3O_{12}$, $CaTiO_3$, $Ca_{0.8}Zn_{0.2}TiO_3$, and $Ca_2Zn_4Ti_{15}O_{36}$. Nonlimiting examples of oxysulfides include $Y_2O_2S$, $Gd_2O_2S$, and $Sr_5Al_2O_7S$. Nonlimiting examples of aluminates include $MgAl_2O_4$, $CaAl_2O_4$, $SrAl_2O_4$, and $Sr_4Al_{14}O_{25}$. In certain examples of the one or more inorganic phosphor dopants (100), the metal oxide (106) is $Ca_2Al_2SiO_7$ doped with $Pr^{3+}$.

In certain examples of the one or more inorganic phosphor dopants (100), the metal fluoride (108) (host lattice) is selected from the group consisting of $Cs_2NaYF_6$, $NaCeF_4$, $NaYF_4$, and $NaGd_4$. Such metal fluoride (108) hosts are often characterized as having a large bandgap, structural defects that are likely to act as electron traps, and anionic defects, which make them useful for inorganic phosphors. In certain examples, the one or more inorganic phosphor dopants (100) is $Cs_2NaYF_6$ doped with $Pr^{3+}$($Cs_2NaYF_6$: $Pr^{3+}$). In an example, the $Pr^{3+}$ substitutes the yttrium ion site in $Cs_2NaYF_6$ in an amount from about 0.3% to about 10%. In other examples, the $Pr^{3+}$ substitutes the yttrium ion site in $Cs_2NaYF_6$ in an amount from about 1% to 5%, 1.5% to 4.5%, 2.5% to 5%, 2% to 7%, 3% to 8%, or 4% to 9%.

In certain examples, the one or more prepared inorganic phosphor dopant(s) (100) is contacted with one or more photoinitiators (114) and one or more monomers (115). In certain examples of the above method, the one or more inorganic phosphor dopants (100) are in powder form and are combined with the photoinitiator(s) (114) and monomer(s) (115). In certain examples, wherein other functional components such as pigments for color are to be included in the UV-curable ink composition (113), the one or more inorganic phosphor dopants (100) may be mixed with the other functional components prior to, at the same, or subsequent to being combined with the photoinitiator(s) (114) and monomer(s) (115).

In certain examples, one or more additives are further incorporated into or otherwise combined with the inorganic phosphor dopants (100), the photoinitiator(s) (114), and the monomer(s) (115), the additives incorporated to improve one or more properties of the UV-curable ink composition (113), such as shelf life, flow, and/or adhesion. For example, surface tension in a print head selected for the process of printing and/or coating a surface (101*a*) must be carefully controlled as it can impact ink wettability and surface tension in droplet formation during printing. In certain examples, surfactants help to control surface tension and may be used in amounts ranging from about 0.1 to 2% by weight. The one or more inorganic phosphor dopants (100), the photoinitiator(s) (114), the monomer(s) (115), and any optional functional components and/or additives are then mixed to form the UV-curable ink composition (113)

IV. Methods of Coating Surfaces

In certain examples, the subject matter described herein is directed to coating a surface (101*a*) with one or more of the ink compositions (110) and/or UV-curable ink compositions (113). As would be evident to one of ordinary skill in the art in light of the present disclosure, such ink compositions (110) and/or UV-curable ink compositions (113) may be employed in a wide variety of applications for such disinfecting properties and improved photostability. As would also be evident to one of ordinary skill in the art in light of the present disclosure, the ink compositions (110) and/or UV-curable ink compositions (113) may be used to coat a surface (101*a*) via a plurality of application methods depending on the industry and/or manufacturing needs. In certain examples, the ink composition (110) and/or UV-curable ink composition (113) can be adjusted to be applied via any number of coating techniques, such as dip coating, spray/aerosolized, roller, or brush-on application. As would be evident to one of ordinary skill in the art, because the inorganic phosphor dopant (100) would be present in a lesser amount compared to the colorant-loading of a pigmented coating, the formulation may be modified and/or rebalanced to support the application in order to result in a stable liquid compatible with the application tools (e.g., paint gun, inkjet printhead, etc.) and thereafter applied via any one or more such application tools. For example, Table 1 sets forth a summary of example application methods, relevant coverage, how such coating is performed, and an identification of types of substrate (101) materials and/or parts that may coated by the associated method.

TABLE 1

| Application Method | Coverage | How does it work | Type of substrate (101) materials/parts to be coated |
|---|---|---|---|
| Dip Coating/ Padding | Full | Immerse material in bath | Rigid parts (e.g. molded or formed parts)<br>Fabrics |
| Spray application | Partial | Spray liquid onto material surface (101a) | Fabrics<br>Rigid parts (e.g. flat surfaces (101a)) |
| Screen printing | Full (e.g. one or both sides)<br>Selective (e.g. stenciled image) | Screen print using mesh onto flat, moving web | Films<br>Textiles |
| Digital printing | Full (e.g. one or both sides)<br>Selective (e.g. image) | Inkjet or electrostatic printers | Films<br>Flat sheets<br>Direct-to-Object<br>Direct-to-Shape<br>Fabrics |
| Roll coating | Full (e.g. one or both side) | Coating roll, doctor blade, nip (gap) controls the ink thickness on the roll, web/flat parts are fed under the coating roll, coating is transferred | Flat sheets<br>Films |

V. Methods for Disinfecting a Surface

In certain examples, the subject matter described herein is directed to a method for disinfecting a surface (101*a*), wherein the surface (101*a*) is coated with an ink composition (110) comprising one or more inorganic phosphor dopants (100), a solvent (111), and a binder (112), the method comprising exposing the surface (101*a*) coated with the ink composition (110) to a UV light source (104) to charge the one or more inorganic phosphor dopants (100) in the ink composition (110) in Step 350, wherein the exposing causes the one or more inorganic phosphor dopants (100) in the ink composition (110) to emit photons (105) with a wavelength of light in UV-C range and wherein the photons (105) irradiate the surface (101*a*), thereby disinfecting the surface (101*a*) in Step 355 as depicted in FIG. 3. Once the ink composition (110) is dried and/or cures, the surface (101*a*) of the substrate (101) is coated with the inorganic phosphor dopants (100), any functional components (e.g., pigments for color), and binder (112).

In other examples, the subject matter described herein is directed to a method for disinfecting a surface (101*a*), wherein the surface (101*a*) is coated with a UV-curable ink composition (113) comprising: one or more inorganic phosphor dopants (100); one or more photoinitiators (114); and one or more monomers (115), the method comprising: exposing the surface (101*a*) coated with the UV-curable ink composition (113) to a UV light source (104), in Step 350 wherein the exposing causes the one or more inorganic phosphor dopants (100) in the UV-curable ink composition (113) to emit photons (105) with a wavelength of light in UV-C range and wherein the photons (105) irradiate the surface (101*a*), thereby disinfecting the surface (101*a*) in Step 355 as depicted in FIG. 3. Once the UV-curable ink composition (113) is cured, the surface (101*a*) of the substrate (101) is coated with the inorganic phosphor dopants (100), any functional components (e.g., pigments for color), and polymer.

When a phosphor is exposed to radiation, the orbital electrons in its molecules are excited to a higher energy level; when they return to their former level, they emit the energy as light of a certain color. Indeed, the scintillation process in inorganic materials is due to the electronic band structure found in the crystals. An incoming particle can excite an electron from the valence band to either the conduction band or the exciton band (located just below the conduction band and separated from the valence band by an energy gap). This leaves an associated hole behind, in the valence band. Impurities create electronic levels in the forbidden gap. The excitons are loosely bound electron-hole pairs that diffuse through the crystal lattice until they are captured as a whole by impurity centers. The latter then rapidly de-excite by emitting scintillation light (i.e. a photon (105)). The wavelength emitted is dependent on the atom itself and on the surrounding crystal structure.

In certain examples, the UV light source (104) used to excite (i.e., charge) the orbital electrons of the inorganic phosphor dopant (100) has a wavelength between about 160 nm and 320 nm. In other examples, the UV light source (104) has a wavelength between about 160 nm and 260 nm, about 160 nm and 200 nm, about 180 nm and 240 nm, about 200 nm and 250 nm, about 210 nm and 250 nm, about 225 nm and 260 nm, about 230 nm and 250 nm, or about 190 nm and 260 nm. In certain other examples, the UV light source (104) has a wavelength of about 222 nm, 254 nm, or 275 nm.

Non-limiting examples of UV light sources (104) include, for example, a black light, a short-wave ultraviolet lamp, an incandescent lamp, a gas-discharge lamp, an ultraviolet LED, a deuterium lamp, a pulsed Xenon light, and an ultraviolet laser. In an example, the UV light source (104) is a pulsed Xenon-ultraviolet device, which can be in the form of a handheld wand. The ultraviolet light emitted from a pulsed Xenon device allows for efficient charging of the inorganic phosphor dopant (100) in the ink composition (110) and/or UV-curable ink composition (113) and can disinfect a coated surface (101*a*) by hovering the Xenon-ultraviolet wand about 1 to 5 inches over the surface (101*a*). In another example, the UV light source (104) is a deuterium lamp, which has a range of light from about 185 nm to about 400 nm.

Other excitation energy sources, in addition to UV light sources (104), may be used in the methods described herein. Personal Protection Equipment (PPE) may be required for operating such energy sources.

In some examples, the emitted radiant energy used for disinfection may not have a color (i.e. UV light). In certain examples of the above method, the inorganic phosphor dopant (100) in the ink composition (110) and/or UV-curable ink composition (113) emits photons (105) with a wavelength of light between about 200 nm and 280 nm. In other examples, the inorganic phosphor dopant (100) in the ink composition (110) and/or UV-curable ink composition (113) emits photons (105) with a wavelength of light between about 200 nm and 270 nm, about 200 nm and 250 nm, about 225 nm and 250 nm, about 200 nm and 225 nm, about 200 nm and 275 nm, or about 225 nm and 275 nm. The emission wavelength of the inorganic phosphor dopant (100) can be tuned by varying the excitation wavelength of the phosphor. In preferred examples, the inorganic phosphor dopant (100) emits UV-C light, having a wavelength of about 200 to 280 nm.

In certain examples, the inorganic phosphor dopant (100) is a metal oxide (106) or a metal fluoride (108) comprising a rare earth ion (107) or transition metal ion. In certain examples, the rare earth ion (107) or transition metal ion is referred to as an "activator ion." As used herein, the "activator ion" is the ion added as a dopant to the crystal structure. The activator ions are surrounded by host-crystal ions and form luminescing centers where the excitation-emission process of the phosphor occurs. The wavelength emitted by the activator ion is influenced by the ion itself, its electronic configuration, and its surrounding crystal structure.

Although the activator ions have intrinsic characteristics that contribute to the optical properties of phosphors, the electronic energy levels of an activator ion in a crystal differ from those of the free ion. The separation of the energy levels can give rise to emission of light from UV across visible wavelengths, depending on the properties of the host crystal. The local geometry around the activator ion affects the spectroscopic behavior of activator ions, in particular, lanthanide ions, incorporated in the host matrix. Certain effects in the crystal lattice, such as ligand field splitting, and centroid shift, can affect energy gaps between f and d orbitals of the activator ion, thereby influencing the luminescence properties of such materials (Lin, Y C., et al. *Top Curr Chem* (*Z*) 374, 21 (2016)).

In certain examples, the one or more inorganic phosphor dopants (100) are a metal oxide (106) comprising a rare earth ion (107). In certain examples, the rare earth ion (107) is a lanthanide ion. In certain examples, the rare earth ion (107) is selected from the group consisting of $Tm^{3+}$, $Pr^{3+}$, $Ho^{3+}$, $Er^{3+}$, $Sm^{3+}$, $Nd^{3+}$, $Yb^{3+}$, $Eu^{3+}$, $Eu^{2+}$, $Gd^{3+}$, $Ce^{3+}$, $Ce^{2+}$, $Tb^{3+}$, $Tb^{4+}$, $Dy^{3+}$, $Yb^{3+}$, and $Lu^{3+}$, or a combination thereof. In certain examples, the one or more inorganic phosphor dopants (100) are a metal oxide (106) comprising a rare earth ion (107) selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof. In certain examples, the rare earth ion (107) is $Pr^{3+}$.

The UV-C emission of $Pr^{3+}$-activated UV-C phosphors is dominated by broad, parity allowed $Pr^{3+}$ $4f^15d^1 \rightarrow 4f^2$ interconfigurational transitions. To ensure the occurrence of $Pr^{3+}$ $4f^15d^1 \rightarrow 4f^2$ transitions in the UV-C in a solid, two general conditions are required: a small Stokes shift of less than about 3000 $cm^{-1}$ (0.37 eV) and an appropriate energy location of the first (lowest energy) $Pr^{3+}$ $4f^2 \rightarrow 4f^15d^1$ excitation transition, which are associated with the compositions and crystal structures of the host lattice. Under these conditions, the nonradiative relaxation of the $Pr^{3+}$ $4f^15d^1$ level to the lower $4f^2$ ($^3P_J$, $^1I_6$, $^1D_2$) levels is minimized; otherwise, crossing of the $4f^15d^1$ level with the lower $4f^2$ levels will occur and, as a result, sharp line $4f^2 \rightarrow 4f^2$ intraconfigurational emission transmission for visible and infrared-light emission will dominate (Wang, X., et al. *Nat Commun* 11, 2040 (2020)).

In certain examples of the one or more inorganic phosphor dopants (100), the metal oxide (106) (host lattice) is selected from the group consisting of silicates, phosphates, borates, oxides, oxynitrides, oxysulfides, and aluminates, or combinations thereof. Such metal oxides (106) are ceramic materials and thus exhibit several advantages, including chemical, thermal, and photochemical stability. In certain examples, the silicate is selected from the group consisting of melilite, cyclosilicate, silicate garnet, oxyorthosilicate, and orthosilicate. Nonlimiting examples of silicates include $Sr_2MgSi_2O_7$, $Ca_2Al_2SiO_7$, $SrAl_2O_4$, $MgSiO_3$, $SrSiO_3$, $CdSiO_3$, $Ba_2SiO_4$, $BaMg_2Si_2O_7$, $Ca_2MgSi_2O_7$, $Sr_{0.5}Ca_{1.5}MgSi_2O_7$, $(Ca,Sr)_2MgSi_2O_7$, $Sr_3MgSi_2O_8$, $Sr_2MgSi_2O_7$, $Ca_{0.5}Sr_{1.5}Al_2SiO_7$, $Sr_3Al_{10}SiO_{20}$, and $Y_2SiO_5$. Nonlimiting examples of borates include $YBO_3$ and $CaAl_2B_2O_7$. Nonlimiting examples of oxynitrides include $MSi_2O_2N_2$, wherein M=Ba, Sr, or Ca. Nonlimiting examples of phosphates include $YPO_4$ and $Zn_3(PO_4)_2$. Nonlimiting examples of oxides include CaO, SrO, BaO, $Y_3Ga_5O_{12}$, $NaGdGeO_4$, $Cd_3Al_2Ge_3O_{12}$, $CaTiO_3$, $Ca_{0.8}Zn_{0.2}TiO_3$, and $Ca_2Zn_4Ti_{15}O_{36}$. Nonlimiting examples of oxysulfides include $Y_2O_2S$, $Gd_2O_2S$, and $Sr_5Al_2O_7S$. Nonlimiting examples of aluminates include $MgAl_2O_4$, $CaAl_2O_4$, $SrAl_2O_4$, and $Sr_4Al_{14}O_{25}$.

In certain examples of the one or more inorganic phosphor dopants (100), the metal oxide (106) is $Ca_2Al_2SiO_7$ doped with $Pr^{3+}$ ($Ca_2Al_2SiO_7$: $Pr^{3+}$). $Ca_2Al_2SiO_7$ is characterized by the melilite structure, in which $Ca^{2+}$ ions are sandwiched between layers of $AlO_4$ and $SiO_4$ tetrahedrons alternating along the c axis and are eightfold coordinated. Each $Ca^{2+}$ ion is bonded to four nearest neighbor $O^{2-}$ ligand ions in both the $AlO_4$ layer and the $SiO_4$ layer, and therefore the four $Ca^{2+}$ complexes in a unit cell are structurally equivalent. In $Ca_2Al_2SiO_7$: $Pr^{3+}$, trivalent $Pr^{3+}$ ions (1.126 Å) substitute for smaller, divalent $Ca^{2+}$ ions (1.12 Å). As such, the doped $Pr^{3+}$ ions are eightfold coordinated. Such highly coordinated, smaller, and charge-imbalanced cation sites can create a suitably strong crystal field for $Pr^{3+}$ ions, by which a small Stokes shift and therefore an efficient $Pr^{3+}$ $4f^15d^1 \rightarrow 4f^2$ interconfigurational transition for UV-C emission is likely to occur. Moreover, without wishing to be bound by theory, the cation size mismatch and charge imbalance are expected to create more effective energy traps (e.g. oxygen vacancies) around $Pr^{3+}$ ions, which help generate effective persistent phosphors (Wang, X., et al. *Nat Commun* 11, 2040 (2020)).

In certain examples of the one or more inorganic phosphor dopants (100), the metal fluoride (108) (host lattice) is selected from the group consisting of $Cs_2NaYF_6$, $NaCeF_4$, $NaYF_4$, and $NaGd_4$. Such metal fluoride (108) hosts are often characterized as having a large bandgap, structural defects that are likely to act as electron traps, and anionic defects, which make them useful for inorganic phosphors. In certain examples, the one or more inorganic phosphor dopants (100) is $Cs_2NaYF_6$ doped with $Pr^{3+}$($Cs_2NaYF_6$: $Pr^{3+}$). In an example, the $Pr^{3+}$ substitutes the yttrium ion site in $Cs_2NaYF_6$ in an amount from about 0.3% to about 10%. In other examples, the $Pr^{3+}$ substitutes the yttrium ion site in $Cs_2NaYF_6$ in an amount from about 1% to 5%, 1.5% to 4.5%, 2.5% to 5%, 2% to 7%, 3% to 8%, or 4% to 9%.

The ink compositions (110) and/or UV-curable ink compositions (113) described herein can be coated on virtually any surface (101*a*) for surface disinfection. Indeed, as described herein, the ink compositions (110) and/or UV-curable ink composition (113) have disinfection properties upon exposure to a UV light source (104). In certain examples, the coated surface (101*a*) is located in an airplane, a hospital, a gym, a school, or other areas where there is significant risk of fomite transfer.

In certain examples of the above method, the coated surface (101*a*) is an interior of an airplane. In certain other examples of the above method, the coated surface (101*a*) is located in a hospital, a gym, or a school. In another example of the above method, the surface (101*a*) resides where there is significant risk of fomite transfer.

In examples of the above method for disinfecting a surface (101*a*), the exposing the surface (101*a*) to a UV light source (104) is for a time sufficient to charge the one or more inorganic phosphor dopants (100) in the ink composition (110) and/or UV-curable ink composition (113). In certain examples, the time sufficient to charge the one or more inorganic phosphor dopants (100) in the ink composition (110) and/or UV-curable ink composition (113) is for about one second to two seconds, one second to thirty seconds, one second to twenty-five seconds, one second to twenty seconds, one second to fifteen seconds, one second to ten seconds, one second to five seconds, two seconds to five seconds, three seconds to fifteen seconds, five seconds to ten seconds, one minute, two minutes, three minutes, four minutes, five minutes, ten minutes, fifteen minutes, twenty minutes, thirty minutes, forty-five minutes, one hour, two hours, three hours, five hours, seven hours, ten hours, fifteen hours, twenty hours, or twenty-four hours. The amount of time sufficient to charge the one or more inorganic phosphor dopants (100) in the ink composition (110) and/or UV-curable ink composition (113) will vary, depending on the wavelength of the UV light and the one or more inorganic phosphor dopants (100), themselves.

In examples of the above method for disinfecting a surface (101*a*), the one or more inorganic phosphor dopants (100) in the ink composition (110) and/or UV-curable ink composition (113) emit photons (105) for about two minutes, three minutes, four minutes, five minutes, six minutes, seven minutes, eight minutes, nine minutes, ten minutes, eleven minutes, twelve minutes, thirteen minutes, fourteen minutes, fifteen minutes, sixteen minutes, seventeen minutes, eighteen minutes, nineteen minutes, twenty minutes, twenty-five minutes, thirty minutes, forty-five minutes, or sixty minutes. The amount of time during which the one or more inorganic phosphor dopants (100) emit photons (105) can be tuned, for example, by modifying the length of time for charging the one or more inorganic phosphor dopants (100). The duration of emission can also be tuned, depending on the desired application. For example, if the surface (101*a*) to be disinfected is located in an airplane, a suitable maximum emission time is about ten minutes, fifteen minutes, twenty minutes, twenty-five minutes, or thirty minutes, such that the disinfection process can proceed in between flights. In certain other examples, longer emission times may correlate with greater levels of disinfection. For example, if the surface (101*a*) to be disinfected is located in a hospital or healthcare facility, emission times could range between about thirty minutes and sixty minutes, as a higher level of disinfection may be desired in this type of setting.

One or more dopant ions can be used to tailor the emissivity to longer or shorter wavelengths, as well as modify the emission intensity. For example, $SrAl_2O_4$ can be doped with $Eu^{2+}$, yielding a phosphor that emits at 520 nm. However, $SrAl_2O_4$ can also be co-doped with $Eu^{2+}$ and $Dy^{3+}$, and works to considerably enhance the persistent luminescent intensity. At room temperature, the afterglow of $SrAl_2O_4$:$Eu^{2+}$, $Dy^{3+}$ lasts for several hours, which is the result of the gradual, thermally assisted release of trapped charges in the phosphor. This long afterglow is in contrast to the duration of only a few minutes for the variant without co-dopant (Xingdong, L., et al. *J. Wuhan Univ. Technol.—Mat. Sci. Edit.* 23, 652-657 (2008)). Further, the materials can be stabilized with inorganic phosphor dopants (100) having energy traps, which can be filled during excitation. The energy traps can be tailored by adjusting the required depth of penetration of UV energy to adjust the decay time needed to decontaminate a surface (101*a*) over time.

As the light emitted by the inorganic phosphor dopant (100) in the ink composition (110) and/or UV-curable ink composition (113) material leaves the surface (101*a*), it isotropically irradiates the surface (101*a*), thereby disinfecting the surface (101*a*). Isotropic irradiation refers to radiation from a point source, radiating uniformly in all directions, with the same intensity, regardless of the direction of the measurement. The light emitted by the one or more inorganic phosphor dopants (100) is short wavelength ultraviolet (ultraviolet C or UV-C) light, having a range between 200 nm to 280 nm or 225 nm to 250 nm, which is known to be germicidal.

In certain examples of the method for disinfecting a surface (101*a*), the UV light source (104) has a wavelength of about 160 to 260 nm; the one or more inorganic phosphor dopants (100) is a silicate comprising $Pr^{3+}$; and wherein the inorganic phosphor dopant (100) emits photons (105) having a wavelength of light of about 265 nm.

VI. Methods for Improving the Color Stability of a Synthetic Polymer

With reference to FIG. 4, in certain examples, the subject matter described herein is directed to a method for improving color stability of a synthetic polymer (121) comprising a surface (101*a*), wherein the surface (101*a*) is coated with an ink composition (110) comprising: one or more inorganic phosphor dopants (100); a solvent (111); and a binder (112), the method comprising exposing the surface (101*a*) of the synthetic polymer (121) coated with the ink composition (110) to UV light to charge the one or more inorganic phosphor dopants in Step 450, wherein the one or more inorganic phosphor dopants (100) in the ink composition (110) absorb the UV light and then allowing the one or more inorganic phosphor dopants (100) to emit the UV light as down-converted visible light (116) in Step 455, thereby created a brighter appearance for the synthetic polymer (121) as depicted in FIG. 4.

With further reference to FIG. 4, in certain other examples, the subject matter described herein is directed to a method for improving color stability of a synthetic polymer (121) comprising a surface (101*a*), wherein the surface (101*a*) is coated with a UV-curable ink composition (113) comprising: one or more inorganic phosphor dopants (100), one or more photoinitiators (114); and one or more monomers (115), the method comprising exposing the surface (101*a*) of the synthetic polymer (121) coated with the UV-curable ink composition (113) to UV light to charge the one or more inorganic phosphor dopants in Step 450, wherein the one or more inorganic phosphor dopants (100) in the UV-curable ink composition (113) absorb the UV light and then and then allowing the one or more inorganic phosphor dopants (100) to emit the UV light as down-converted visible light (116) in Step 455, thereby created a brighter appearance for the synthetic polymer (121) as depicted in FIG. 4.

When a phosphor is exposed to radiation, the orbital electrons in its atoms are excited to a higher energy level; when they return to their former level they emit the energy as light of a certain color. Indeed, the scintillation process in inorganic materials is due to the electronic band structure found in the crystals. An incoming particle can excite an electron from the valence band to either the conduction band or the exciton band (located just below the conduction band and separated from the valence band by an energy gap). This leaves an associated hole behind, in the valence band. Impurities create electronic levels in the forbidden gap. The excitons are loosely bound electron-hole pairs that wander through the crystal lattice until they are captured as a whole by impurity centers. The latter then rapidly de-excite by emitting scintillation light (i.e. a photon (105)). The wavelength emitted is dependent on the atom itself and on the surrounding crystal structure.

As described herein, the one or more inorganic phosphor dopants (100) in the ink composition (110) and/or UV-curable ink composition (113) absorb UV light and emit that UV light as down-converted visible light (116). In certain examples, the UV light used to excite (charge) the orbital electrons of the one or more inorganic phosphor dopants (100) has a wavelength between about 160 nm and 380 nm. In other examples, the UV light has a wavelength between about 160 nm and 320 nm, about 160 nm and 260 nm, about 160 nm and 200 nm, about 180 nm and 240 nm, about 200 nm and 250 nm, about 250 nm to 380 nm, about 210 nm and 250 nm, about 225 nm and 260 nm, about 230 nm and 250 nm, or about 190 nm and 260 nm. In certain other examples, the UV light has a wavelength of about 222 nm, 254 nm, or 275 nm.

Nonlimiting examples of UV light sources (104) used to provide the UV light in the above method include, for example, a black light, a short-wave ultraviolet lamp, an incandescent lamp, a deuterium lamp, a gas-discharge lamp, an ultraviolet LED, a pulsed Xenon light, and an ultraviolet laser. For example, the UV light source (104) can be a pulsed Xenon-ultraviolet device in the form of a handheld wand. The wand can be held at a distance of 1 to 5 inches, for example, from the coated surface (101*a*), wherein the one or more inorganic phosphor dopants (100) in the ink composition (110) and/or UV-curable ink composition (113) absorb the UV light. In another example, the UV light source (104) used to provide the UV light is a deuterium lamp, which has a range of light from about 185 nm to about 400 nm.

Other excitation energy sources, in addition to UV light sources (104), may be used in the methods described herein. Personal Protection Equipment (PPE) may be required for operating such energy sources.

In certain examples of the above method for improving color stability of a synthetic polymer (121), the absorption of the UV light by the one or more inorganic phosphor dopants (100) reduces photo-oxidation of the synthetic polymer (121). As used herein, reducing photo-oxidation of the synthetic polymer (121) refers to the reduction in discoloration and/or embrittlement of the synthetic polymer (121) upon exposure to UV light because the one or more inorganic phosphor dopants (100) in the ink composition (110) and/or UV-curable ink composition (113) that coats a surface (101*a*) of the synthetic polymer (121) absorb most of the UV light instead of the synthetic polymer (121) itself. The specific reduction in photo-oxidation is material-dependent, given the different behaviors in UV absorption among synthetic polymers (121). The one or more inorganic phosphor dopants (100) typically exhibit a very intense absorption. As such, incorporation of the one or more inorganic phosphor dopants (100) into the ink composition (110) and/or UV-curable ink composition (113) that coats a surface (101*a*) of the synthetic polymer (121) can reduce photo-oxidation of the synthetic polymer (121) by up to 1%, 2%, 3%, 4%, 5%, 6%, 7%, 8%, 9%, 10%, 11%, 12%, 13%, 14%, 15%, 16%, 17%, 18%, 19%, 20%, 25%, 26%, 27%, 28%, 29%, 30%, 31%, 32%, 33%, 34%, 35%, 36%, 37%, 38%, 39% 40%, 41%, 42%, 43%, 44%, 45%, 50%, 55%, 60%, 65%, 70%, 75%, 80%, 85%, 90%, 95%, 96%, 97%, 98%, 99%, or 100% compared with a synthetic polymer (121) whose surface (101*a*) is not coated with an ink composition (110) and/or a UV-curable ink composition (113) described herein. Photo-oxidation of a material can be detected using infrared spectroscopy, for example. In particular, peroxy-species and carbonyl groups formed by photo-oxidation often contain distinct absorption bands.

In certain examples of the method for improving color stability of a synthetic polymer (121), the visible light (116) emitted by the one or more inorganic phosphor dopants (100) produces a brighter appearance for the synthetic polymer (121). The brighter appearance is perceived by a viewer observing the synthetic polymer (121). Indeed, “brightness” as used herein is an attribute of visual perception in which a source appears to be radiating or reflecting light. Brightness is the perception elicited by the luminance of a visual target. In certain examples, the one or more inorganic phosphor dopants (100) can emit blue visible light (116), which has a wavelength between 450 nm and 495 nm. The blue visible light (116) emitted from the ink composition (110) and/or UV-curable ink composition (113) comprising the one or more inorganic phosphor dopants (100) that coats a surface (101*a*) of the synthetic polymer (121) can visually offset yellow discoloration of the synthetic polymer (121). The before-mentioned effect is similar to that of broad visible emission, in which certain dopants in a material that emit broad light have the effect of making the overall material appear visually brighter.

In certain examples of the method for improving color stability of a synthetic polymer (121), the light emitted by the one or more inorganic phosphor dopants (100) in the ink composition (110) and/or UV-curable ink composition (113)

is down-converted visible light (116). In certain examples of the above method, the one or more inorganic phosphor dopants (100) emit visible light (116) with a wavelength between about 200 and 700 nm. In other examples, the one or more inorganic phosphor dopants (100) emit visible light (116) with a wavelength between about 400 nm and 495 nm, about 620 nm and 700 nm, about 590 and 620 nm, about 570 nm and 590 nm, about 495 nm and 570 nm, about 390 and 450 nm, about 380 nm and 600 nm, about 350 nm and 460 nm, about 600 nm and 700 nm, about 450 and 600 nm, about 200 and 280 nm, about 450 nm and 495 nm, about 380 and 450 nm, about 200 nm and 270 nm, about 200 nm and 250 nm, about 225 nm and 250 nm, about 200 nm and 225 nm, about 200 nm and 275 nm, or about 225 nm and 275 nm. The specific wavelength or range of wavelengths can be selected based on the desired color of light to be emitted. For example, if it is desirable for the inorganic phosphor dopant (100) to emit blue light, then a phosphor that emits visible light (116) with a wavelength between about 400 nm and 495 nm will be selected. In certain other examples, if it is desirable for the inorganic phosphor dopant (100) to emit green light, then a phosphor that emits visible light (116) with a wavelength between about 495 and 570 nm will be selected. In other examples, if it is desirable for the inorganic phosphor dopant (100) to emit violet light, then a phosphor that emits visible light (116) with a wavelength between about 380 nm and 450 nm will be selected. In certain other examples, if it is desirable for the inorganic phosphor dopant (100) to emit yellow light, then a phosphor that emits visible light (116) with a wavelength between about 570 nm and 590 nm will be selected. In further examples, if it is desirable for the inorganic phosphor dopant (100) to emit orange light, then a phosphor that emits visible light (116) with a wavelength between about 590 nm and 620 nm will be selected. Furthermore, in other examples, if it is desirable for the inorganic phosphor dopant (100) to emit red light, then a phosphor that emits visible light (116) with a wavelength between about 620 nm and 700 nm will be selected.

In certain examples of the method for improving color stability of a synthetic polymer (121), the ink composition (110) and/or UV-curable ink composition (113) that coats a surface (101*a*) of the synthetic polymer (121) comprises two or more inorganic phosphor dopants (100), wherein the down-converted visible light (116) emitted by the two or more inorganic phosphor dopants (100) combines to yield white or off-white light. In certain examples of the method for improving color stability of a synthetic polymer (121), the ink composition (110) and/or UV-curable ink composition (113) that coats a surface (101*a*) of the synthetic polymer (121) comprises three or more inorganic phosphor dopants (100), wherein the down-converted visible light (116) emitted by the three or more inorganic phosphor dopants (100) combines to yield white or off-white light. For example, an inorganic phosphor dopant (100) that emits blue visible light (116) having a wavelength between about 450 nm and 495 nm can be inserted into the ink composition (110) and/or UV-curable ink composition (113) that coats a surface (101*a*) of the synthetic polymer (121) with a second inorganic phosphor dopant (100) that emits yellow visible light (116) having a wavelength between about 570 nm and 590 nm. The combination of blue and yellow visible light (116) emitted by the first and second inorganic phosphor dopants (100) will yield white or off-white emission (white visible light (116)). In a similar manner, a first inorganic phosphor dopant (100) that emits blue visible light (116) having a wavelength between about 450 nm and 495 nm can be inserted into the ink composition (110) and/or UV-curable ink composition (113) that coats a surface (101*a*) of the synthetic polymer (121) with a second inorganic phosphor dopant (100) that emits green visible light (116) having a wavelength between about 495 nm and 570 nm, and a third inorganic phosphor dopant (100) that emits red visible light (116) having a wavelength between about 620 nm and 750 nm. The combination of blue, green, and red visible light (116) emitted by the first, second, and third inorganic phosphor dopants (100) will yield white or off-white emission (white visible light (116)).

In certain examples of the method for improving color stability of a synthetic polymer (121), the synthetic polymer (121) having a surface (101*a*) is a thermoplastic or thermoset. In certain examples, the synthetic polymer (121) is selected from the group consisting of tetrafluoroethylene, polyvinyl fluoride, polyurethane, polyester, epoxy, phenolic, vinyl ester, polyamide, polyamide-imide, polyether imide, polyvinylchloride, polyether ketone ketone, polycarbonate, polyphenylsulphone, polymethylmethacrylate, polyacrylate, and benzoxazine. In particular, fluorine is known to strongly resist photo-oxidation because of its high electronegativity and desire to accept an electron. As such, in certain examples, fluorinated synthetic polymers, such as tetrafluoroethylene or polyvinyl fluoride, are useful for the synthetic polymers (121) in the methods described herein. Additionally, thermosetting polymers are generally known to have a higher degree of cross linking compared to other types of polymers, which makes them further resistant to photo-oxidation.

In certain examples of the method for improving color stability of a synthetic polymer (121), the one or more inorganic phosphor dopants (100) are a metal oxide (106) or a metal fluoride (108) comprising a rare earth ion (107) or transition metal ion. The rare earth ion (107) or transition metal ion is referred to as an "activator ion." As used herein, the "activator ion" is the ion added as a dopant to the crystal structure. The activator ions are surrounded by host-crystal ions and form luminescing centers where the excitation-emission process of the phosphor occurs. The wavelength emitted by the activator ion is dependent on the ion itself, its electronic configuration, and on its surrounding crystal structure. In certain examples, the rare earth ion (107) is a lanthanide ion. In certain examples, the rare earth ion (107) is selected from the group consisting of $Tm^{3+}$, $Pr^{3+}$, $Ho^{3+}$, $Er^{3+}$, $Sm^{3+}$, $Nd^{3+}$, $Yb^{3+}$, $Eu^{3+}$, $Eu^{2+}$, $Gd^{3+}$, $Ce^{3+}$, $Ce^{2+}$, $Tb^{3+}$, $Tb^{4+}$, $Dy^{3+}$, $Yb^{3+}$, $Y^{3+}$, and $Lu^{3+}$, or a combination thereof. In certain examples, the one or more inorganic phosphor dopants (100) are a metal oxide (106) or a metal fluoride (108) comprising a rare earth ion (107) selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof. In certain examples the one or more inorganic phosphor dopants (100) is a metal oxide (106) comprising a rare earth ion (107). In examples, the rare earth ion (107) is selected in combination with the metal oxide (106) to prepare an inorganic phosphor dopant (100) that will emit light having a particular color and wavelength. For example, $Eu^{3+}$ doped in $Y_2O_3$ is expected to emit red-orange visible light (116) having a wavelength of about 611 nm, while $Eu^{3+}$ doped in $InBO_3$ is expected to emit yellow visible light (116) having a wavelength of about 588 nm. In another example, $Eu^{2+}$ doped in $BaMg_2Al_{16}O_{27}$ can be selected, which is expected to emit blue visible light (116) having a wavelength of about 450 nm.

In certain examples of the method for improving color stability of a synthetic polymer (121), the one or more inorganic phosphor dopants (100) is a metal fluoride (108), selected from the group consisting of $Cs_2NaYF_6$, $NaCeF_4$, $NaYF_4$, and $NaGd_4$, and which comprises a rare earth ion (107) or transition metal ion. Such metal fluoride (108) hosts are often characterized as having a large bandgap, structural defects that are likely to act as electron traps, and anionic defects, which make them useful for inorganic phosphors.

In certain examples of the method for improving color stability of a synthetic polymer (121), the one or more inorganic phosphor dopants (100) is a metal oxide (106), selected from the group consisting of silicates, phosphates, borates, oxides, oxynitrides, oxysulfides, and aluminates, or combinations thereof. In certain examples, the silicate is selected from the group consisting of melilite, cyclosilicate, silicate garnet, oxyorthosilicate, and orthosilicate. Nonlimiting examples of silicates include $Sr_2MgSi_2O_7$, $Ca_2Al_2SiO_7$, $SrAl_2O_4$, $MgSiO_3$, $SrSiO_3$, $CdSiO_3$, $Ba_2SiO_4$, $BaMg_2Si_2O_7$, $Ca_2MgSi_2O_7$, $Sr_{0.5}Ca_{1.5}MgSi_2O_7$, $(Ca,Sr)_2MgSi_2O_7$, $Sr_3MgSi_2O_8$, $Sr_2MgSi_2O_7$, $Ca_{0.5}Sr_{1.5}Al_2SiO_7$, $Sr_3Al_{10}SiO_{20}$, and $Y_2SiO_5$. Nonlimiting examples of borates include $YBO_3$, $InBO_3$, and $CaAl_2B_2O_7$. Nonlimiting examples of oxynitrides include $MSi_2O_2N_2$, wherein M is Ba, Sr, or Ca. Nonlimiting examples of phosphates include $YPO_4$ and $Zn_3(PO_4)_2$. Nonlimiting examples of oxides include CaO, SrO, BaO, $Y_3Ga_5O_{12}$, $NaGdGeO_4$, $Cd_3Al_2Ge_3O_{12}$, $CaTiO_3$, $Ca_{0.8}Zn_{0.2}TiO_3$, and $Ca_2Zn_4Ti_{15}O_{36}$. Nonlimiting examples of oxysulfides include $Y_2O_2S$, $Gd_2O_2S$, and $Sr_5Al_2O_7S$. Nonlimiting examples of aluminates include $MgAl_2O_4$, $CaAl_2O_4$, $SrAl_2O_4$, and $Sr_4Al_{14}O_{25}$.

In certain examples, the ink composition (110) and/or UV-curable ink composition (113) that coats a surface (101*a*) of the synthetic polymer (121) comprises two different inorganic phosphor dopants (100), wherein each inorganic phosphor dopant (100) is a metal oxide (106) or a metal fluoride (108) comprising a rare earth ion (107), and wherein the combined emission of the two inorganic phosphor dopants (100) produces white or off-white visible light (116). In certain examples, the ink composition (110) and/or UV-curable ink composition (113) that coats a surface (101*a*) of the synthetic polymer (121) comprises two different inorganic phosphor dopants (100) wherein the two different inorganic phosphor dopants (100) are metal oxides (106) comprising a rare earth ion (107). As one example, the ink composition (110) and/or UV-curable ink composition (113) that coats a surface (101*a*) of the synthetic polymer (121) can comprise a first inorganic phosphor dopant (100) of $Y_2SiO_5$:Ce(III), which emits blue visible light (116) having a wavelength of about 400 nm, and a second inorganic phosphor dopant (100) of $InBO_3$:Eu(III), which emits yellow visible light (116) having a wavelength of about 588 nm. Together, the combined visible light (116) will yield white or off-white visible light (116).

In certain examples, the ink composition (110) and/or UV-curable ink composition (113) that coats a surface (101*a*) of the synthetic polymer (121) comprises three different inorganic phosphor dopants (100), wherein each inorganic phosphor dopant (100) is a metal oxide (106) or a metal fluoride (108) comprising a rare earth ion (107), and wherein the combined emission of the three inorganic phosphor dopants (100) produces white or off-white visible light (116). For example, in certain examples, the ink composition (110) and/or UV-curable ink composition (113) that coats a surface (101*a*) of the synthetic polymer (121) comprises a first inorganic phosphor dopant (100) of $BaMg_2Al_6O_{27}$:Eu(II), which emits blue visible light (116) having a wavelength of about 450 nm, a second inorganic phosphor dopant (100) of $Y_2SiO_5$:Tb(III), which emits green visible light (116) having a wavelength of about 545 nm, and a third inorganic phosphor dopant (100) of $Y_2O_3$:Eu(III), which emits red visible light (116) having a wavelength of about 611 nm. Together, the combined visible light (116) will yield white or off-white visible light (116).

In certain examples of the method for improving color stability of a synthetic polymer composition, the surface (101*a*) of the synthetic polymer (121) is located in the interior of an airplane. In certain other examples, the surface (101*a*) of the synthetic polymer (121) is a substrate (101) or a surface (101*a*) located in a hospital or other healthcare facility, school, gym, or automobile.

In certain examples of the method for improving color stability of a synthetic polymer composition, the exposing the surface (101*a*) to UV light is for a time sufficient to charge the one or more inorganic phosphor dopants (100) in the ink composition (110) and/or UV-curable ink composition (113). In certain examples, the time sufficient to charge the one or more inorganic phosphor dopants (100) in the ink composition (110) and/or UV-curable ink composition (113) is for about five minutes, ten minutes, fifteen minutes, twenty minutes, thirty minutes, forty-five minutes, one hour, two hours, three hours, five hours, seven hours, ten hours, fifteen hours, twenty hours, or twenty-four hours.

The one or more inorganic phosphor dopants (100) absorb UV light and emit the UV light as down-converted visible light (116) for a time typically on the order of nanoseconds. Further, in examples, the phosphors absorb energy and do not release light immediately. Rather, in examples, the energy dissipates in picoseconds to the lowest excited state prior to emission. In certain examples, with the application of continuous illumination, for example, the one or more inorganic phosphor dopants (100) absorb UV light and emit the UV light as down-converted visible light (116) continuously.

In certain other examples, persistent phosphors can be applied in the above method for improving color stability of a synthetic polymer (121). Persistent phosphors are different from ordinary conversion phosphors as they exhibit light emission that persists seconds to hours after the excitation has stopped. The reason for this delayed emission is their ability to store energy in the material, presumably at defects other than the luminescent "activator" ion. These defects are called traps because a charge carrier originating from the luminescent ion is locally trapped at the defect. When sufficient energy is provided to the trapped charge it will be released. After recombination at the luminescent ion, it will give rise to the delayed emission that is generally referred to as afterglow. The timespan of the afterglow can be tuned, as it depends on the so-called depth of the trap, which is typically probed by thermoluminescence. For example, it is generally understood that shallow traps are easily emptied, whereas deep traps are difficult to empty at room temperature; a portion of captured electrons remains stored there. If a trap is too deep, the captured electrons cannot escape, preventing persistent after-glow. Thermoluminescence can be used to evaluate the trap depth. Indeed, a thermoluminescence glow curve represents the intensity of emitted light versus temperature; each glow peak is associated with a recombination center and related to a specific trap. The glow curve can provide useful information for the material. Activation energy and escape frequency factor can be calculated from the glow curve, for example. Many methods can be used to calculate trap parameters based on the kinetics order of glow peaks, such as initial rise method and variable heating rates. Based on the glow curve, the luminescence efficiency of a material can be obtained.

The changes in the structure-luminescence properties of a material can be observed through modifications in its glow curve. A decrease in thermoluminescence intensity can sometimes be attributed to the suppression of traps, for example. In other examples, the luminescence efficiency of a material can increase upon the addition of impurities (such as another ion) to the phosphor. The presence of such impurities can modify trap distributions, as well as deepen trap sites caused by modifications in energy gaps in the phosphor. Thermoluminescence glow curves can be obtained using a thermoluminescence meter, such as a FJ-427 A TL meter.

In certain other examples, the electronic transitions of the phosphors can be characterized as "forbidden." A forbidden transition is a spectral line associated with absorption or emission of photons (105) by atomic nuclei or atoms that undergo a transition that is not allowed by a particular selection rule, but is allowed if the approximation associated with that rule is not made. For example, in a situation where, according to usual approximations (such as the electric dipole approximation for the interaction with light), the process cannot happen, but at a higher level of approximation (i.e. magnetic dipole) the process is allowed but at a slower rate. One example of such a forbidden transition is observed in phosphorescent glow-in-the-dark materials, which absorb light and form an excited state whose decay involves a spin flip, which is forbidden by electric dipole transitions. The result is emission of light slowly over minutes or hours. Indeed, "forbidden" transitions occur at much slower speeds than "allowed" transitions. "Allowed" transitions are those that: follow appropriate (1) spin and (2) Laporte (orbital) selection rules; exhibit a change in parity (symmetry) during the transition; emit a photon having energy that matches the gap between the ground and excited state; and which exhibit a change in dipole moment. Allowed spin selection rules state that there should be no change in the spin orientation (i.e. no spin inversion proceeds during an electronic transition). In accordance with the Laporte selection rules, in a centrosymmetric environment, transitions between like atomic orbitals, such as s-s, p-p, d-d, or f-f transitions are forbidden. Even though a transition may be forbidden, it is often coupled with vibrational factors, which reduce the molecular symmetry of the system, for example and make some previously forbidden transitions allowed by the reduction in symmetry. This often results in weakly allowed transitions, and causes the transition rate to decrease. A typical emission lifetime of a material undergoing a forbidden transition can be milliseconds or even seconds.

As discussed above, the one or more inorganic phosphor dopants (100) can be used to tailor the emissivity to longer or shorter wavelengths and to also create white light in certain examples.

In certain examples of the method for improving color stability of a synthetic polymer (121), the synthetic polymer (121) is a thermoplastic material; the ink composition (110) and/or UV-curable ink composition (113) comprises two inorganic phosphor dopants (100), wherein the first inorganic phosphor dopant (100) is $Y_2SiO_5$:Ce(III), which emits blue visible light (116) having a wavelength of about 400 nm, and the second inorganic phosphor dopant (100) is $InBO_3$:Eu(III), which emits yellow visible light (116) having a wavelength of about 588 nm. The phosphors in the ink composition (110) and/or UV-curable ink composition (113) that coats the synthetic polymer (121) are exposed to UV light using a Xenon-ultraviolet wand for approximately ten minutes before they emit visible light (116), which is combined to produce white visible light (116).

Further, the disclosure comprises examples according to the following clauses:

Clause 1. An ink composition comprising: one or more inorganic phosphor dopants; a solvent; and a binder.

Clause 2. The ink composition of clause 1, wherein the one or more inorganic phosphor dopants have a diameter no greater than 0.5 μm μm.

Clause 3. The ink composition of clause 1 or 2, wherein the one or more inorganic phosphor dopants are each independently selected from the group consisting of a metal oxide and a metal fluoride comprising a rare earth ion selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof.

Clause 4. The ink composition of clause 3, wherein the rare earth ion is $Pr^{3+}$.

Clause 5. The ink composition of clause 3 or 4, wherein the metal oxide, in each instance, is selected from the group consisting of silicates, phosphates, borates, oxides, oxynitrides, oxysulfides, and aluminates, or combinations thereof.

Clause 6. The ink composition of any of clauses 1-5, wherein the solvent is selected from the group consisting of water, methanol, ethanol, propanol, isopropyl alcohol, butanol, acetone, tetrahydrofuran, dioxane, 2-pyrrolidone, N-methyl-2-pyrrolidone, dimethylsulfoxide, ethylene glycol ethers, propylene glycol ethers, esters, cyclohexanone, isophorone, and alkyl lactate.

Clause 7. The ink composition of any of clauses 1-6, wherein the binder is selected from the group consisting of ethyl cellulose, polymethyl methacrylate, polyurethane, latex, polydimethylsiloxane, polyvinyl alcohol, vinyl chloride/vinyl acetate co-polymers, acrylics, and polyketones.

Clause 8. The ink composition of any of clauses 1-7, wherein the ink composition has a viscosity of about 2 mPa-s to about 30 mPa-s.

Clause 9. The ink composition of any of clauses 1-8, wherein the ink composition is formulated as an aerosol spray.

Clause 10. A UV-curable ink composition comprising: one or more inorganic phosphor dopants; one or more photoinitiators; and one or more monomers.

Clause 11. The UV-curable ink composition of clause 10, wherein the one or more inorganic phosphor dopants have a diameter no greater than 0.5 μm.

Clause 12. The UV-curable ink composition of clause 10 or 11, wherein the one or more inorganic phosphor dopants are each independently selected from the group consisting of a metal oxide and a metal fluoride comprising a rare earth ion selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof.

Clause 13. The UV-curable ink composition of clause 12, wherein the rare earth ion is $Pr^{3+}$.

Clause 14. The UV-curable ink composition of clause 12 or 13, wherein the metal oxide, in each instance, is selected from the group consisting of silicates, phosphates, borates, oxides, oxynitrides, oxysulfides, and aluminates, or combinations thereof.

Clause 15. The UV-curable ink composition of any of clauses 10-14, wherein the one or more photoinitiators are each independently selected from the group consisting of 4,4'-bis(dimethylamino)benzophenone, thioxanthen-9-one, 1-hydroxy-cyclohexyl-phenyl-ketone, 2,4-Dinitro-1-naphthol, diphenyl(2,4,6-trimethylbenzoyl)phosphine oxide (TPO), azobisisobutyronitrile (AIBN), benzyl dimethyl ketal (BDK, Irgacure 651), 2-hydroxy-methyl-1-phenyl propane (Darocure 1173), hydroxycyclohexylphenylketone, (HCPK, Irgacure 184), Irgacure 907, Irgacure 369, monoacyl phosphine oxide (Lucerin TPO), Esacure KIP150, monoacylphosphine oxides (MAPO) and bisacylphosphine oxide photoinitiators (BAPO).

Clause 16. The UV-curable ink composition of any of clauses 10-15, wherein the one or more monomers are each independently an acrylate monomer.

Clause 17. The UV-curable ink composition of any of clauses 10-16, further comprising one or more additives for reducing surface tension and/or improving substrate wetting.

Clause 18. The UV-curable ink composition of any of clauses 10-17, wherein the UV-curable ink composition has a viscosity of about 5 mPa-s to about 35 mPa-s.

Clause 19. The ink composition of any of clauses 1-9, or the UV-curable ink composition of any of clauses 10-18, wherein the ink composition has disinfection properties upon exposure to a UV light source.

Clause 20. A synthetic polymer comprising a surface, wherein the surface is coated with at least one coating of the ink composition of any of clauses 1-9, or the UV-curable ink composition of any of clauses 10-18, and wherein the coating provides the synthetic polymer with improved color stability.

Clause 21. A method for disinfecting a surface, wherein the surface is coated with the ink composition of any of clauses 1-9 or the UV-curable ink composition of any of clauses 10-18, the method comprising: exposing the surface to a UV light source, wherein the exposing causes the one or more inorganic phosphor dopants in the ink composition to emit photons; and wherein the photons irradiate the surface, thereby disinfecting the surface.

Clause 22. The method of clause 21, wherein the one or more inorganic phosphor dopants emit photons with a wavelength of light between about 200 nm and 280 nm.

Clause 23. The method of clause 21 or 22, wherein the one or more inorganic phosphor dopants emit photons with a wavelength of light between about 225 and 250 nm, Clause 24. The method of any of clauses 21-23, wherein the UV light source has a wavelength between about 160 nm and 320 nm.

Clause 25. The method of any of clauses 21-24, wherein the UV light source has a wavelength of about 222 nm, 254 nm, or 275 nm.

Clause 26. A method for improving color stability of a synthetic polymer comprising a surface, wherein the surface is coated with the ink composition of any of clauses 1-9 or the UV-curable ink composition of any of clauses 10-18, the method comprising: exposing the surface to UV light, wherein the one or more inorganic phosphor dopants in the ink composition absorb the UV light and then emit the UV light as down-converted visible light.

Clause 27. The method of clause 26, wherein the presence of the ink composition coating the surface reduces photo-oxidation of the synthetic polymer.

Clause 28. The method of clause 26 or 27, wherein the visible light emitted by one or more inorganic phosphor dopants in the ink composition produces a brighter appearance for the synthetic polymer.

Clause 29. The method of any of clauses 26-28, wherein the ink composition comprises two or more inorganic phosphor dopants, wherein the down-converted visible light emitted by the two or more inorganic phosphor dopants combines to yield white or off-white visible light.

Clause 30. The method of any of clauses 26-28, wherein the ink composition comprises three or more inorganic phosphor dopants, wherein the down-converted visible light emitted by the three or more inorganic phosphor dopants combines to yield white or off-white visible light.

Clause 31. The method of any of clauses 26-30, wherein the UV light absorbed by the one or more inorganic phosphor dopants has a wavelength between about 160 nm and 380 nm.

Clause 32. The method of any of clauses 26-31, wherein the synthetic polymer is a thermoplastic or thermoset.

Clause 33. The method of any of clauses 26-32, wherein the synthetic polymer is selected from the group consisting of tetrafluoroethylene, polyvinyl fluoride, polyurethane, polyester, epoxy, phenolic, vinyl ester, polyamide, polyamide-imide, polyether imide, polyvinylchloride, polyether ketone ketone, polycarbonate, polyphenylsulphone, polymethylmethacrylate, polyacrylate, and benzoxazine.

Clause 34. A method of making the ink composition of any of clauses 1-9, comprising: contacting a solvent with one or more inorganic phosphor dopants and a binder, wherein the ink composition is prepared.

Clause 35. A method of making the UV-curable ink composition of any of clauses 10-18, comprising: contacting one or more inorganic phosphor dopants with one or more photoinitiators and one or more monomers, wherein the UV-curable ink composition is prepared.

The following examples are offered by way of illustration and not by way of limitation. Those skilled in the art will appreciate that other synthetic routes may be used to synthesize the inorganic phosphor dopants (100) and inorganic phosphor-doped substrate materials described herein. Although specific starting materials and reagents are depicted and discussed in the Examples, other starting materials and reagents can be easily substituted to provide a variety of derivative materials and/or reaction conditions. In addition, many of the exemplary materials prepared by the described methods can be further modified in light of this disclosure using conventional chemistry well known to those skilled in the art.

EXAMPLES

Example 1: Preparation of Photon-Emitting Inorganic Phosphor-Doped Ink Composition Coated Substrate ($Ca_{2-x}Al_2SiO_{7:x}Pr^{3+}$-Doped Polyvinyl Fluoride)

Step 1. Preparation of $Ca_{2-x}Al_2SiO_{7:x}Pr^{3+}$

CaO, $Al_2O_3$, $SiO_2$, and $Pr_6O_{11}$ are purchased from Sigma Aldrich. CaO, $Al_2O_3$, $SiO_2$, and $Pr_6O_{11}$ are weighed out such that the amount of $Pr_6O_{11}$ in the mixture will yield a 0.5-5% substitution by praseodymium on the calcium site. The powders are then ground using an agate mortar and pestle for approximately five minutes, until the powders form a gray, fine mixture. Following this, the mixed powder is placed in a ceramic alumina crucible and pre-fired in air at 900° C. for two hours. Following this, the mixed powder is ground up in an agate mortar and pestle for approximately three minutes. The mixed powder is then placed back in the alumina crucible and in a furnace for heating at 1300° C. in air for seven hours. The powders are removed from the furnace and allowed to cool to room temperature.

The prepared $Ca_{2-x}Al_2SiO_{7:x}Pr^{3+}$ inorganic phosphor dopant (100) is analyzed by powder X-ray diffraction. The crystal structure is solved using FullProf to verify the Ca/Pr site mixing in the $Ca_2Al_2SiO_7$ crystal structure.

Step 2. Preparation of $Ca_{2-x}Al_2SiO_{7:x}Pr^{3+}$-doped Coated Substrate

The $Ca_{2-x}Al_2SiO_{7:x}Pr^{3+}$ powder prepared in Step 1 is thoroughly mixed with a solvent(s) (111) and binder(s) (112) such that the $Ca_{2-x}Al_2SiO_{7:x}Pr^{3+}$ and binder(s) (112) are uniformly incorporated into the solvent(s) (111), thereby forming the ink composition (110). Using a piezoelectric print head, the ink composition (110) is inkjet printed onto the surface (101*a*) of a host substrate (101) material, forming a $Ca_{2-x}Al_2SiO_{7:x}Pr^{3+}$-doped coated substrate (101) material. The ink composition (110) is then allowed to cure.

Example 2: Disinfection Using Inorganic Phosphor-Doped Ink Composition Coated-Substrate Material ($Ca_{2-x}Al_2SiO_{7:x}Pr^{3+}$-Doped Coated Substrate)

The $Ca_{2-x}Al_2SiO_{7:x}Pr^{3+}$-doped coated substrate (101) material prepared in Step 2 is exposed to a UV light source (104) having a wavelength between about 160 nm and 280 nm. This is the radiant excitation energy for the $Ca_{2-x}Al_2SiO_{7:x}Pr^{3+}$ phosphors in the ink composition (110) coated on the surface (101*a*) of the host substrate (101) material. The $Ca_{2-x}Al_2SiO_{7:x}Pr^{3+}$-doped coated substrate (101) material is exposed to the UV light source (104), such as a UV lamp, for approximately two minutes to ten minutes, allowing the $Ca_{2-x}Al_2SiO_{7:x}Pr^{3+}$ phosphors to charge. The UV light source (104) is then turned off. The $Ca_{2-x}Al_2SiO_{7:x}Pr^{3+}$ phosphors coated on the substrate (101) material then emit light in the range of 200 nm to 280 nm for about two to ten minutes. This range of light emission corresponds with UV-C light, which is known to be germicidal. The germicidal light emitted by the $Ca_{2-x}Al_2SiO_{7:x}Pr^{3+}$ phosphors coated on the surface (101*a*) of the substrate (101) material irradiates the surface (101*a*) of the $Ca_{2-x}Al_2SiO_{7:x}Pr^{3+}$-doped coated substrate (101) material, thereby disinfecting the surface (101*a*). A spectrofluorometer is used to measure the afterglow intensity of the phosphor-doped substrate (101) material.

In another example, the UV light source (104) can be a pulsed Xenon-ultraviolet device or a pulsed Xenon lamp, having a wavelength of about 222 nm, 254 nm, or 275 nm is exposed to the $Ca_{2-x}Al_2SiO_{7:x}Pr^{3+}$-doped coated substrate (101) material prepared in Step 2. In one example, a surface (101*a*) of the $Ca_{2-x}Al_2SiO_{7:x}Pr^{3+}$-doped coated substrate (101) material is exposed to UV light source (104), such as a pulsed Xenon-ultraviolet device having a 254 nm wavelength for approximately two minutes. When the excitation light is removed, UV-C persistent luminescence emission at 268 nm is obtained. The observation of $Pr^{3+}$ UV-C afterglow in the $Ca_{2-x}Al_2SiO_{7:x}Pr^{3+}$-doped coated substrate (101) material suggests that the energy traps in the $Ca_{2-x}Al_2SiO_{7:x}Pr^{3+}$ phosphors can be effectively filled by 254 nm light excitation and that the energy traps are located at appropriate energy positions so that they can efficiently capture electrons from the $Pr^3{+}4f^1 5d^1$ state during the excitation and release the electrons back to the $4f^1 5d^1$ state due to ambient thermal stimulation after the excitation ceases. The isotropic light emission effectively disinfects the surface (101*a*) of the $Ca_{2-x}Al_2SiO_{7:x}Pr^{3+}$-doped coated substrate (101) material. A spectrofluorometer is used to measure the afterglow intensity of the phosphor-doped surface (101*a*) of the substrate (101) material.

Example 3: Preparation of Photon-Emitting Inorganic Phosphor-Doped Coated Substrate Material ($NaY_{(1-x)}F_{6:x}Pr^{3+}$-Doped Tetrafluoroethylene)

Step 1: Preparation of $NaY_{(1-x)}F_{6:x}Pr^{3+}$

Pr-doped polycrystalline fluoride elpasolite phosphors, with nominal compositions of $Cs_2NaY_{(1-x)}F_{6:x}Pr^{3+}$ (wherein x=0.01-0.10), are prepared by solid-state synthesis. $Cs_2CO_3$ (1.6290 g, 99.99%, Aladdin, Shanghai, China), $NaHCO_3$, (0.4200 g, 99.99%, Aladdin, Shanghai, China), $Y_2O_3$, (0.5588 g, 99.99%, Aladdin, Shanghai, China), $NH_4F$ (2.2222 g, 99.99%, Aladdin, Shanghai, China), and $Pr_6O_{11}$ (0.0085 g, 99.996%, Alfa, United States) powders are mixed together with 3 mL of acetone and then ground thoroughly for about five minutes. The obtained powders are thermally treated at 150° C. in air for 7 h, followed by regrinding to obtain a fine powder. The mixture is then sintered at 450° C. for 30 min in air. The obtained powders are then reground, followed by sintering at 700° C. for 10 h under a nitrogen atmosphere. Corundum boats with a purity of 99% and a platinum crucible are used as vessels for the above synthesis.

The prepared $Cs_2NaY_{(1-x)}F_{6:x}Pr^{3+}$ inorganic phosphor dopant (100) is analyzed by powder X-ray diffraction. The crystal structure is solved using FullProf to verify the Y/Pr site mixing in the $Cs_2NaY_{(1-x)}F_{6:x}Pr^{3+}$ crystal structure. The structure crystalizes in a Fm-3m space group that corresponds to the cubic elpasolite. In this double perovskite structure, both Y and Na coordinate with six fluorine atoms, and doped $Pr^{3+}$ ions substitute for $Y^{3+}$ ions.

Step 2. Preparation of $Cs_2NaY_{(1-x)}F_{6:x}Pr^{3+}$-Doped Coated Tetrafluoroethylene The $Cs_2NaY_{(1-x)}F_{6:x}Pr^{3+}$ powder prepared in Step 1 is thoroughly mixed with a solvent (111) and binder (112) such that the $Cs_2NaY_{(1-x)}F_{6:x}Pr^{3+}$ and binder (112) are uniformly incorporated into the solvent (111), thereby forming the ink composition (110). Using a piezoelectric print head, the ink composition (110) is printed onto the surface (101*a*) of a host substrate (101) material, forming a $Cs_2NaY_{(1-x)}F_{6:x}Pr^{3+}$-doped coated substrate material. The ink composition (110) is then allowed to cure, forming a solidified $Cs_2NaY_{(1-x)}F_{6:x}Pr^{3+}$-doped coating on the surface (101*a*) of the tetrafluoroethylene substrate (101) material.

Example 4: Disinfection Using Inorganic Phosphor-Doped Coated Substrate Material ($Cs_2NaY_{(1-x)}F_{6:x}Pr^{3+}$-Doped Coated Tetrafluoroethylene)

The $Cs_2NaY_{(1-x)}F_{6:x}Pr^{3+}$-doped coated tetrafluoroethylene substrate (101) material prepared in Step 2 is exposed to UV light source (104), such as a pulsed Xenon lamp, for approximately 30 seconds having a wavelength between 100 nm and 225 nm. The pulsed light is sufficient to charge the $Cs_2NaY_{(1-x)}F_{6:x}Pr^{3+}$ phosphors on the coated surface (101*a*) of the tetrafluoroethylene substrate (101) material. The $Cs_2NaY_{(1-x)}F_{6:x}Pr^{3+}$ phosphors in the coating then emit light in the range of 200 nm to 280 nm (germicidal light) for about ten to twenty minutes. The germicidal light emitted by the $Cs_2NaY_{(1-x)}F_{6:x}Pr^{3+}$ phosphors in the coating of the substrate (101) material isotropically irradiate the surface (101*a*) of the $Cs_2NaY_{(1-x)})F_{6:x}Pr^{3+}$-doped coated tetrafluoroethylene substrate (101) material, thereby disinfecting the surface (101*a*). A spectrofluorometer is used to measure the afterglow intensity of the phosphor-doped coating of the substrate (101) material.

Efforts have been made to ensure accuracy with respect to numbers used (e.g., amounts, temperature, etc.) but some experimental errors and deviations should be accounted for.

One skilled in the art will recognize many methods and materials similar or equivalent to those described herein, which could be used in practicing the subject matter described herein. The present disclosure is in no way limited to just the methods and materials described.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller rangers is also encompassed, subject to any specifically excluded limit in the stated range. Where the stated range includes one or both of the limits, ranges excluding either or both of those included limits are also included.

Many modifications and other examples of the disclosure set forth herein will come to mind to one skilled in the art to which these disclosures pertain having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain example combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An ink composition comprising:

one or more inorganic phosphor dopants comprising $Ca_{2-x}Al_2SiO_7$;

a solvent; and a binder, wherein the binder comprises polyketones, wherein the ink composition has disinfection properties upon exposure to a UV light source, and wherein the one or more inorganic phosphor dopants emit photons with a wavelength of light between about 200 nm and 280 nm.

2. The ink composition of claim 1, wherein the one or more inorganic phosphor dopants have a diameter no greater than 0.5 um.

3. The ink composition of claim 1, wherein the one or more inorganic phosphor dopants further comprise a rare earth ion selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof.

4. The ink composition of claim 3, wherein the rare earth ion is $Pr^{3+}$.

5. The ink composition of claim 1, further comprising a metal oxide selected from the group consisting of silicates, phosphates, borates, oxides, oxynitrides, oxysulfides, and aluminates, or combinations thereof.

6. The ink composition of claim 1, wherein the solvent is selected from the group consisting of water, methanol, ethanol, propanol, isopropyl alcohol, butanol, acetone, tetrahydrofuran, dioxane, 2-pyrrolidone, N-methyl-2-pyrrolidone, dimethylsulfoxide, ethylene glycol ethers, propylene glycol ethers, esters, cyclohexanone, isophorone, and alkyl lactate.

7. The ink composition of claim 1, wherein the binder further comprises a material that is selected from the group consisting of ethyl cellulose, polymethyl methacrylate, polyurethane, latex, polydimethylsiloxane, polyvinyl alcohol, vinyl chloride/vinyl acetate co-polymers, and acrylics.

8. The ink composition of claim 1, wherein the ink composition has a viscosity of about 2 mPa-s to about 30 mPa-s.

9. The ink composition of claim 1, wherein the ink composition is formulated as an aerosol spray.

10. A UV-curable ink composition comprising:

one or more inorganic phosphor dopants comprising $Ca_{2-x}Al_2SiO_7$;

one or more photoinitiators; and one or more monomers, wherein the one or more monomers comprise isophoryl acrylate, wherein the UV-curable ink composition has disinfection properties upon exposure to a UV light source, and wherein the one or more inorganic phosphor dopants emit photons with a wavelength of light between about 200 nm and 280 nm.

11. The UV-curable ink composition of claim 10, wherein the one or more inorganic phosphor dopants have a diameter no greater than 0.5 um.

12. The UV-curable ink composition of claim 10, wherein the one or more inorganic phosphor dopants further comprise a rare earth ion selected from the group consisting of $Pr^{3+}$, $Ce^{3+}$, $Eu^{3+}$, $Eu^{2+}$, $Gd^{3+}$, $Tb^{3+}$, and $Dy^{3+}$, or a mixture thereof.

13. The UV-curable ink composition of claim 12, wherein the rare earth ion is $Pr^{3+}$.

14. The UV-curable ink composition of claim 10, further comprising a metal oxide selected from the group consisting of silicates, phosphates, borates, oxides, oxynitrides, oxysulfides, and aluminates, or combinations thereof.

15. The UV-curable ink composition of claim 10, wherein the one or more photoinitiators are each independently selected from the group consisting of 4,4'-bis(dimethylamino) benzophenone, thioxanthen-9-one, 1-hydroxy-cyclohexyl-phenyl-ketone, 2,4-Dinitro-1-naphthol, diphenyl (2,4,6-trimethylbenzoyl) phosphine oxide (TPO), azobisisobutyronitrile (AIBN), benzyl dimethyl ketal (BDK, Irgacure 651), 2-hydroxy-methyl-1-phenyl propane (Darocure 1173), hydroxycyclohexylphenylketone, (HCPK, Irgacure 184), Irgacure 907, Irgacure 369, monoacyl phosphine oxide (Lucerin TPO), Esacure KIP150, monoacylphosphine oxides (MAPO) and bisacylphosphine oxide photoinitiators (BAPO).

16. The UV-curable ink composition of claim 10, wherein the one or more monomers further comprise an additional acrylate monomer.

17. The UV-curable ink composition of claim 10, further comprising one or more additives for reducing surface tension and/or improving substrate wetting.

18. The UV-curable ink composition of claim 10, wherein the UV-curable ink composition has a viscosity of about 5 mPa-s to about 35 mPa-s.

19. The ink composition of claim 1, wherein the ink composition has disinfection properties upon exposure to a UV light source.

20. A synthetic polymer comprising a surface, wherein the surface is coated with at least one coating of the UV-curable ink composition of claim 10, and wherein the coating provides the synthetic polymer with improved color stability.

* * * * *